United States Patent
Djuric et al.

(10) Patent No.: US 12,296,856 B2
(45) Date of Patent: May 13, 2025

(54) AUTONOMOUS VEHICLE BLIND SPOT MANAGEMENT

(71) Applicant: Aurora Operations, Inc., Mountain View, CA (US)

(72) Inventors: Nemanja Djuric, Pittsburgh, PA (US); Shivam Gautam, Austin, TX (US); Abhishek Mohta, Santa Clara, CA (US)

(73) Assignee: Aurora Operations, Inc., Pittsburgh, PA (US)

( * ) Notice: Subject to any disclaimer, the term of this patent is extended or adjusted under 35 U.S.C. 154(b) by 274 days.

(21) Appl. No.: 18/046,839

(22) Filed: Oct. 14, 2022

(65) Prior Publication Data
US 2024/0124028 A1   Apr. 18, 2024

(51) Int. Cl.
*B60W 60/00*   (2020.01)

(52) U.S. Cl.
CPC ... *B60W 60/0027* (2020.02); *B60W 2300/145* (2013.01); *B60W 2554/4041* (2020.02); *B60W 2554/4042* (2020.02); *B60W 2554/4044* (2020.02); *B60W 2720/106* (2013.01); *B60W 2720/12* (2013.01)

(58) Field of Classification Search
CPC ....... B60W 60/0027; B60W 2300/145; B60W 2554/4041; B60W 2554/4042; B60W 2554/4044; B60W 2720/106; B60W 2720/12
See application file for complete search history.

(56) References Cited

U.S. PATENT DOCUMENTS

| | | |
|---|---|---|
| 2009/0037104 A1 | 2/2009 | Basson et al. |
| 2012/0310466 A1* | 12/2012 | Fairfield ............... G05D 1/0246 701/28 |
| 2017/0363727 A1* | 12/2017 | Prasad ................. G08G 1/0962 |
| 2019/0129429 A1* | 5/2019 | Juelsgaard ............. G01S 17/00 |
| 2021/0233407 A1 | 7/2021 | Schondorf |

FOREIGN PATENT DOCUMENTS

| | | |
|---|---|---|
| EP | 3467698 | 4/2019 |
| WO | 2024081540 | 4/2024 |

OTHER PUBLICATIONS

"International Application Serial No. PCT US2023 076089, International Search Report mailed Feb. 15, 2024", 3 pgs.
"International Application Serial No. PCT US2023 076089, Written Opinion mailed Feb. 15, 2024", 4 pgs.

* cited by examiner

*Primary Examiner* — Peter D Nolan
*Assistant Examiner* — Anwar Mohamed
(74) *Attorney, Agent, or Firm* — Schwegman Lundberg & Woessner, P.A.

(57) ABSTRACT

Various examples are directed to systems and methods for controlling an autonomous vehicle comprising a tractor and a trailer. For example, a system may determine that a line from a position of a first sensor on the autonomous vehicle to a position of a first actor in an environment of the autonomous vehicle intersects the trailer. The system may determine that the first actor is in a blind spot of the autonomous vehicle, generate a motion plan for the autonomous vehicle, and control the autonomous vehicle in accordance with the motion plan.

20 Claims, 16 Drawing Sheets

AUTONOMOUS VEHICLE BLIND SPOT MANAGEMENT

BACKGROUND

The automobile industry is currently developing autonomous features for controlling vehicles under certain circumstances. According to Society of Automotive Engineers (SAE) International standard J3016, there are 6 levels of autonomy ranging from Level 0 (no autonomy) up to Level 5 (vehicle capable of operation without operator input in all conditions). A vehicle with autonomous features utilizes sensors to sense the environment that the vehicle navigates through. Acquiring and processing data from the sensors allows the vehicle to navigate through its environment.

SUMMARY

An autonomous vehicle may sometimes have one or more blind spots. A blind spot may be a portion of the environment of an autonomous vehicle that is outside the field-of-view of at least one of the sensors of the autonomous vehicle. Blind spots can create challenges for autonomous vehicles, for example, when actors may enter and/or exit a blind spot. When an actor is present in the blind spot, sensor data may not provide sufficient information about the actor.

Various examples described herein are directed to systems and methods for controlling an autonomous vehicle while considering at least one vehicle blind spot. For example, the autonomous vehicle (e.g., an autonomy system thereof) may access sensor position data describing the position of at least one sensor on the autonomous vehicle and actor position data describing the position of an actor in the environment of the autonomous vehicle. Using the position of at least one sensor and the position of the actor, the autonomous vehicle may determine whether the actor is present in a blind spot of the autonomous vehicle.

In some implementations, a method is provided that comprises accessing sensor position data describing a position of a first sensor on the autonomous vehicle. The method may also comprise accessing actor position data describing a position of a first actor in an environment of the autonomous vehicle and determining that a line from the position of the first sensor to the position of the first actor intersects the trailer. The method may also comprise determining that the first actor is in a blind spot of the autonomous vehicle based at least in part on the determining that the line from the position of the first sensor to the position of the first actor intersects the trailer and generating a motion plan for the autonomous vehicle based at least in part on the determining that the first actor is in the blind spot of the autonomous vehicle. The method may also comprise controlling the autonomous vehicle in accordance with the motion plan.

These and other implementations of the instant disclosure may include one or more of the following features.

In some implementations, the sensor position data also describes a position of a second sensor on the autonomous vehicle. The method may also comprise determining that a second line from the position of the second sensor to the position of the first actor intersects the trailer. The determining that the first actor is in the blind spot of the autonomous vehicle may also be based at least in part on the determining that the second line from the position of the second sensor to the position of the first actor intersects the trailer.

In some implementations, the sensor position data may describe positions of a plurality of sensors, where the plurality of sensors comprises the first sensor. The method may further comprise determining that lines from the respective positions of each sensor of the plurality of sensors intersect the trailer. The determining that the first actor is in the blind spot of the autonomous vehicle may also be based at least in part on the determining that the lines from the respective positions of each sensor of the plurality of sensors intersects the trailer.

In some implementations, the sensor position data may also describe a position of a second actor in the environment of the autonomous vehicle and the sensor position data may also describe a position of a second sensor on the autonomous vehicle. The method may further comprise determining that a line from the position of the first sensor to the position of the second actor intersects the trailer and determining that a line from the position of the second sensor to the position of the second actor does not intersect the trailer method may also comprise determining that the second actor is outside the blind spot of the autonomous vehicle.

In some implementations, the method may also comprise determining a pose of the trailer. The pose of the trailer may describe a position of the trailer. The method may also comprise using the pose of the trailer to determine that the line from the position of the first sensor to the position of the first actor intersects the trailer.

In some implementations, the method may also comprise determining the position of the first actor based at least in part on last known state data describing a last known state of the first actor.

In some implementations, the last known state data may comprise at least one of a last known location of the first actor, a last known velocity of the first actor, a last known acceleration of the first actor, a last known heading of the first actor or a last known orientation of the first actor.

In some implementations, the method may further comprise setting a blind spot flag to indicate that at least one actor is in the blind spot of the autonomous vehicle. The generating of the motion plan may be based at least in part on the blind spot flag.

In some implementations, the method may further comprise generating an estimated track for the first actor in the blind spot of the autonomous vehicle using last known state data describing a last known state of the first actor. The generating of the motion plan may be based at least in part on the estimated track for the first actor.

In some implementations, the generating of the motion plan may comprise modifying a cost associated with a first candidate motion plan of a plurality of candidate motion plans to generate a modified cost and using the modified cost to determine a cost associated with the first candidate motion plan. The generating of the motion plan may further comprise selecting the motion plan from the plurality of candidate motion plans, where the selecting may be based at least in part on the cost associated with the first candidate motion plan.

In some implementations, the generating of the motion plan may comprise modifying a first candidate motion plan to generate a modified first motion plan. The modifying may be based at least in part on the determining that the first actor is in the blind spot of the autonomous vehicle. The generating of the motion plan may further comprise selecting the motion plan from a plurality of candidate motion plans, where the plurality of candidate motion plans may include the modified first motion plan.

In some implementations, the modifying of the first candidate motion plan may comprise at least one of: modifying an acceleration associated with the first candidate motion plan; or modifying a lateral speed associated with the first candidate motion plan.

In some implementations, the method may further comprise accessing blind spot actor data describing at least one actor in the blind spot of the autonomous vehicle and determining that sensor data generated by at least one sensor on the autonomous vehicle indicates that an actor has exited the blind spot of the autonomous vehicle. The method may further comprise decrementing a number of actors in the blind spot.

In some implementations, the method may further comprise accessing blind spot actor data describing at least one actor in the blind spot of the autonomous vehicle, the at least one actor comprising the first actor and determining that more than a threshold time period has passed since the determining that the first actor is in the blind spot of the autonomous vehicle. The method may further comprise decrementing a number of actors in the blind spot.

In some implementations, the method may further comprise determining that there are no actors remaining in the blind spot of the autonomous vehicle and generating a second motion plan for the autonomous vehicle based at least in part on the determining that there are no actors remaining in the blind spot of the autonomous vehicle. The method may further comprise controlling the autonomous vehicle in accordance with the second motion plan.

In some implementations, an autonomous vehicle is provided comprising: a tractor; a trailer; and at least one processor programmed to perform operations. The operations may comprise accessing sensor position data describing a position of a first sensor on the autonomous vehicle and accessing actor position data describing a position of a first actor in an environment of the autonomous vehicle. The operations may further comprise determining that a line from the position of the first sensor to the position of the first actor intersects the trailer and determining that the first actor is in a blind spot of the autonomous vehicle based at least in part on the determining that the line from the position of the first sensor to the position of the first actor intersects the trailer. The operations may additionally comprise generating a motion plan for the autonomous vehicle based at least in part on the determining that the first actor is in the blind spot of the autonomous vehicle and controlling the autonomous vehicle in accordance with the motion plan.

These and other implementations of the instant disclosure may include one or more of the following features.

In some implementations, the generating of the motion plan may comprise modifying a cost associated with a first candidate motion plan of a plurality of candidate motion plans to generate a modified cost and using the modified cost to determine a cost associated with the first candidate motion plan. The generating a motion plan may further comprise selecting the motion plan from the plurality of candidate motion plans. The selecting may be based at least in part on the cost associated with the first candidate motion plan.

In some implementations, the generating of the motion plan may comprise modifying a first candidate motion plan to generate a modified first motion plan. The modifying may be based at least in part on the determining that the first actor is in the blind spot of the autonomous vehicle. The generating of the motion plan may further comprise selecting the motion plan from a plurality of candidate motion plans. The plurality of candidate motion plans may include the modified first motion plan.

In some implementations, the modifying of the first candidate motion plan may comprise at least one of: modifying an acceleration associated with the first candidate motion plan; or modifying a lateral speed associated with the first candidate motion plan.

In some implementations, a non-transitory computer-readable storage medium is provided. The non-transitory computer-readable storage medium may comprise instructions thereon that, when executed by one or more processors, cause the one or more processors to perform operations. The operations may comprise accessing sensor position data describing a position of a first sensor on an autonomous vehicle. The autonomous vehicle may comprise a tractor and a trailer. The operations may further comprise accessing actor position data describing a position of a first actor in an environment of the autonomous vehicle and determining that a line from the position of the first sensor to the position of the first actor intersects the trailer. The operations may further comprise determining that the first actor is in a blind spot of the autonomous vehicle based at least in part on the determining that the line from the position of the first sensor to the position of the first actor intersects the trailer and generating a motion plan for the autonomous vehicle based at least in part on the determining that the first actor is in the blind spot of the autonomous vehicle. T operations may further comprise controlling the autonomous vehicle in accordance with the motion plan.

DRAWINGS

DETAILED DESCRIPTION

The following describes the technology of this disclosure within the context of an autonomous vehicle for example purposes only. As described herein, the technology described herein is not limited to an autonomous vehicle and can be implemented for or within other autonomous platforms and other computing systems.

Figure 1:
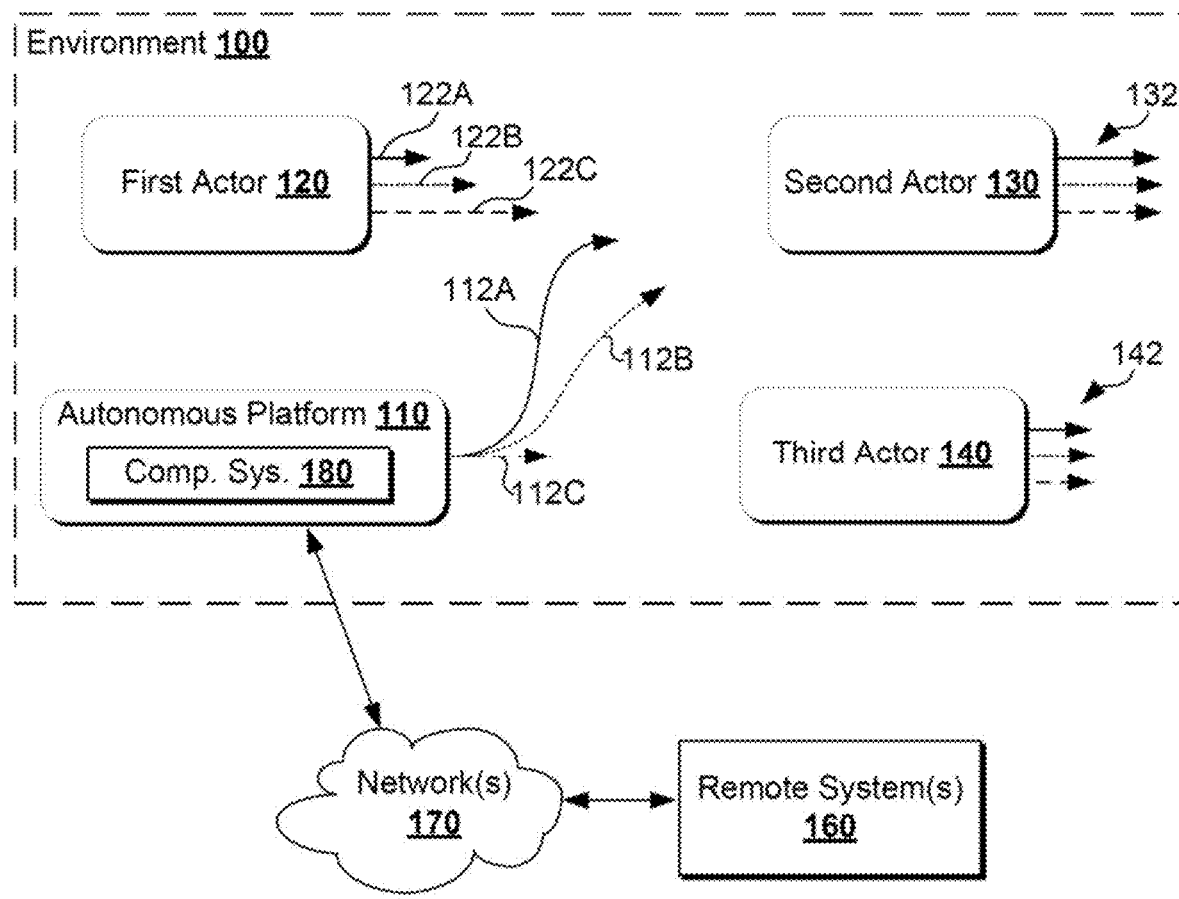
FIG. 1 is a block diagram of an example operational scenario, according to some implementations of the present disclosure.

With reference to FIGS. 1-15, example implementations of the present disclosure are discussed in further detail. FIG. 1 is a block diagram of an example operational scenario, according to some implementations of the present disclosure. In the example operational scenario, an environment 100 contains an autonomous platform 110 and a number of objects, including first actor 120, second actor 130, and third actor 140. In the example operational scenario, the autonomous platform 110 can move through the environment 100 and interact with the object(s) that are located within the environment 100 (e.g., first actor 120, second actor 130, third actor 140, etc.). The autonomous platform 110 can optionally be configured to communicate with remote system(s) 160 through network(s) 170.

The environment 100 may be or include an indoor environment (e.g., within one or more facilities, etc.) or an outdoor environment. An indoor environment, for example, may be an environment enclosed by a structure such as a building (e.g., a service depot, maintenance location, manufacturing facility, etc.). An outdoor environment, for example, may be one or more areas in the outside world such as, for example, one or more rural areas (e.g., with one or more rural travel ways, etc.), one or more urban areas (e.g., with one or more city travel ways, highways, etc.), one or more suburban areas (e.g., with one or more suburban travel ways, etc.), or other outdoor environments.

The autonomous platform 110 may be any type of platform configured to operate within the environment 100. For example, the autonomous platform 110 may be a vehicle configured to autonomously perceive and operate within the environment 100. The vehicles may be a ground-based autonomous vehicle such as, for example, an autonomous car, truck, van, etc. The autonomous platform 110 may be an autonomous vehicle that can control, be connected to, or be otherwise associated with implements, attachments, and/or accessories for transporting people or cargo. This can include, for example, an autonomous tractor optionally coupled to a cargo trailer. Additionally, or alternatively, the autonomous platform 110 may be any other type of vehicle such as one or more aerial vehicles, water-based vehicles, space-based vehicles, other ground-based vehicles, etc.

The autonomous platform 110 may be configured to communicate with the remote system(s) 160. For instance, the remote system(s) 160 can communicate with the autonomous platform 110 for assistance (e.g., navigation assistance, situation response assistance, etc.), control (e.g., fleet management, remote operation, etc.), maintenance (e.g., updates, monitoring, etc.), or other local or remote tasks. In some implementations, the remote system(s) 160 can provide data indicating tasks that the autonomous platform 110 should perform. For example, as further described herein, the remote system(s) 160 can provide data indicating that the autonomous platform 110 is to perform a trip/service such as a user transportation trip/service, delivery trip/service (e.g., for cargo, freight, items), etc.

The autonomous platform 110 can communicate with the remote system(s) 160 using the network(s) 170. The network(s) 170 can facilitate the transmission of signals (e.g., electronic signals, etc.) or data (e.g., data from a computing device, etc.) and can include any combination of various wired (e.g., twisted pair cable, etc.) or wireless communication mechanisms (e.g., cellular, wireless, satellite, microwave, radio frequency, etc.) or any desired network topology (or topologies). For example, the network(s) 170 can include a local area network (e.g., intranet, etc.), a wide area network (e.g., the Internet, etc.), a wireless LAN network (e.g., through Wi-Fi, etc.), a cellular network, a SATCOM network, a VHF network, a HF network, a WiMAX based network, or any other suitable communications network (or combination thereof) for transmitting data to or from the autonomous platform 110.

As shown for example in FIG. 1, the environment 100 can include one or more objects. The object(s) may be objects not in motion or not predicted to move ("static objects") or object(s) in motion or predicted to be in motion ("dynamic objects" or "actors"). In some implementations, the environment 100 can include any number of actor(s) such as, for example, one or more pedestrians, animals, vehicles, etc. The actor(s) can move within the environment according to one or more actor trajectories. For instance, the first actor 120 can move along any one of the first actor trajectories 122A-C, the second actor 130 can move along any one of the second actor trajectories 132, the third actor 140 can move along any one of the third actor trajectories 142, etc.

As further described herein, the autonomous platform 110 can utilize its autonomy system(s) to detect these actors (and their movement) and plan its motion to navigate through the environment 100 according to one or more platform trajectories 112A-C. The autonomous platform 110 can include onboard computing system(s) 180. The onboard computing system(s) 180 can include one or more processors and one or more memory devices. The one or more memory devices can store instructions executable by the one or more processors to cause the one or more processors to perform operations or functions associated with the autonomous platform 110, including implementing its autonomy system(s).

Figure 2:
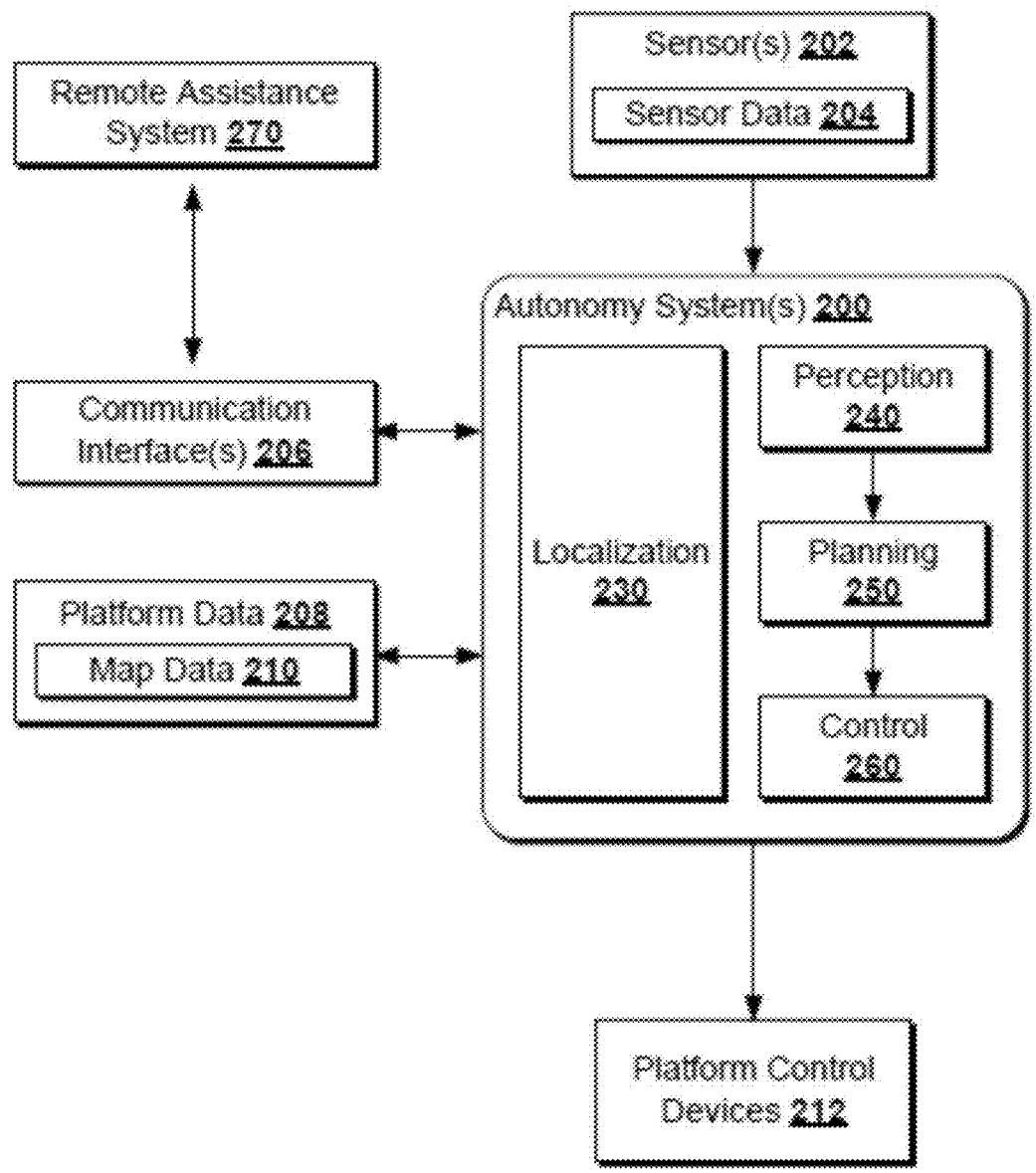
FIG. 2 is a block diagram of an example autonomy system for an autonomous platform, according to some implementations of the present disclosure.

FIG. 2 is a block diagram of an example autonomy system 200 for an autonomous platform, according to some implementations of the present disclosure. In some implementations, the autonomy system 200 can be implemented by a computing system of the autonomous platform (e.g., the onboard computing system(s) 180 of the autonomous platform 110). The autonomy system 200 can operate to obtain inputs from sensor(s) 202 or other input devices. In some implementations, the autonomy system 200 can additionally obtain platform data 208 (e.g., map data 210) from local or remote storage. The autonomy system 200 can generate control outputs for controlling the autonomous platform (e.g., through platform control devices 212, etc.) based on sensor data 204, map data 210, or other data. The autonomy system 200 may include different subsystems for performing various autonomy operations. The subsystems may include a localization system 230, a perception system 240, a planning system 250, and a control system 260. The localization system 230 can determine the location of the autonomous platform within its environment; the perception system 240 can detect, classify, and track objects and actors in the environment; the planning system 250 can determine a trajectory for the autonomous platform; and the control system 260 can translate the trajectory into vehicle controls for controlling the autonomous platform. The autonomy system 200 can be implemented by one or more onboard computing system(s). The subsystems can include one or more processors and one or more memory devices. The one or more memory devices can store instructions executable by the one or more processors to cause the one or more processors to perform operations or functions associated with the subsystems. The computing resources of the autonomy system 200 can be shared among its subsystems, or a subsystem can have a set of dedicated computing resources.

In some implementations, the autonomy system 200 can be implemented for or by an autonomous vehicle (e.g., a ground-based autonomous vehicle). The autonomy system 200 can perform various processing techniques on inputs (e.g., the sensor data 204, the map data 210) to perceive and understand the vehicle's surrounding environment and generate an appropriate set of control outputs to implement a vehicle motion plan (e.g., including one or more trajectories) for traversing the vehicle's surrounding environment (e.g., environment 100 of FIG. 1, etc.). In some implementations, an autonomous vehicle implementing the autonomy system 200 can drive, navigate, operate, etc. with minimal or no interaction from a human operator (e.g., driver, pilot, etc.).

In some implementations, the autonomous platform can be configured to operate in a plurality of operating modes. For instance, the autonomous platform can be configured to operate in a fully autonomous (e.g., self-driving, etc.) operating mode in which the autonomous platform is controllable without user input (e.g., can drive and navigate with no input from a human operator present in the autonomous vehicle or remote from the autonomous vehicle, etc.). The autonomous platform can operate in a semi-autonomous operating mode in which the autonomous platform can operate with some input from a human operator present in the autonomous platform (or a human operator that is remote from the autonomous platform). In some implementations, the autonomous platform can enter into a manual operating mode in which the autonomous platform is fully controllable by a human operator (e.g., human driver, etc.) and can be prohibited or disabled (e.g., temporary, permanently, etc.) from performing autonomous navigation (e.g., autonomous driving, etc.). The autonomous platform can be configured to operate in other modes such as, for example, park or sleep modes (e.g., for use between tasks such as waiting to provide a trip/service, recharging, etc.). In some implementations, the autonomous platform can implement vehicle operating assistance technology (e.g., collision mitigation system, power assist steering, etc.), for example, to help assist the human operator of the autonomous platform (e.g., while in a manual mode, etc.).

The autonomy system 200 can be located onboard (e.g., on or within) an autonomous platform and can be configured to operate the autonomous platform in various environments. The environment may be a real-world environment or a simulated environment. In some implementations, one or more simulation computing devices can simulate one or more of: the sensors 202, the sensor data 204, communication interface(s) 206, the platform data 208, or the platform control devices 212 for simulating operation of the autonomy system 200.

In some implementations, the autonomy system 200 can communicate with one or more networks or other systems with the communication interface(s) 206. The communication interface(s) 206 can include any suitable components for interfacing with one or more network(s) (e.g., the network(s) 170 of FIG. 1, etc.), including, for example, transmitters, receivers, ports, controllers, antennas, or other suitable components that can help facilitate communication. In some implementations, the communication interface(s) 206 can include a plurality of components (e.g., antennas, transmitters, or receivers, etc.) that allow it to implement and utilize various communication techniques (e.g., multiple-input, multiple-output (MIMO) technology, etc.).

In some implementations, the autonomy system 200 can use the communication interface(s) 206 to communicate with one or more computing devices that are remote from the autonomous platform (e.g., the remote system(s) 160) over one or more network(s) (e.g., the network(s) 170). For instance, in some examples, one or more inputs, data, or functionalities of the autonomy system 200 can be supplemented or substituted by a remote system communicating over the communication interface(s) 206. For instance, in some implementations, the map data 210 can be downloaded over a network to a remote system using the communication interface(s) 206. In some examples, one or more of the localization system 230, the perception system 240, the planning system 250, or the control system 260 can be updated, influenced, nudged, communicated with, etc. by a remote system for assistance, maintenance, situational response override, management, etc.

The sensor(s) 202 can be located onboard the autonomous platform. In some implementations, the sensor(s) 202 can include one or more types of sensor(s). For instance, one or more sensors can include image capturing device(s) (e.g., visible spectrum cameras, infrared cameras, etc.). Additionally, or alternatively, the sensor(s) 202 can include one or more depth capturing device(s). For example, the sensor(s) 202 can include one or more Light Detection and Ranging (LIDAR) sensor(s) or Radio Detection and Ranging (RADAR) sensor(s). The sensor(s) 202 can be configured to generate point data descriptive of at least a portion of a three-hundred-and-sixty-degree view of the surrounding environment. The point data can be point cloud data (e.g., three-dimensional LIDAR point cloud data, RADAR point cloud data). In some implementations, one or more of the sensor(s) 202 for capturing depth information can be fixed to a rotational device in order to rotate the sensor(s) 202 about an axis. The sensor(s) 202 can be rotated about the axis while capturing data in interval sector packets descriptive of different portions of a three-hundred-and-sixty-degree view of a surrounding environment of the autonomous platform. In some implementations, one or more of the sensor(s) 202 for capturing depth information can be solid state.

The sensor(s) 202 can be configured to capture the sensor data 204 indicating or otherwise being associated with at least a portion of the environment of the autonomous platform. The sensor data 204 can include image data (e.g., 2D camera data, video data, etc.), RADAR data, LIDAR data (e.g., 3D point cloud data, etc.), audio data, or other types of data. In some implementations, the autonomy system 200 can obtain input from additional types of sensors, such as inertial measurement units (IMUs), altimeters, inclinometers, odometry devices, location or positioning devices (e.g., GPS, compass), wheel encoders, or other types of sensors. In some implementations, the autonomy system 200 can obtain sensor data 204 associated with particular component(s) or system(s) of an autonomous platform. This sensor data 204 can indicate, for example, wheel speed, component temperatures, steering angle, cargo or passenger status, etc. In some implementations, the autonomy system 200 can obtain sensor data 204 associated with ambient conditions, such as environmental or weather conditions. In some implementations, the sensor data 204 can include multi-modal sensor data. The multi-modal sensor data can be obtained by at least two different types of sensor(s) (e.g., of the sensors 202) and can indicate static object(s) or actor(s) within an environment of the autonomous platform. The multi-modal sensor data can include at least two types of sensor data (e.g., camera and LIDAR data). In some implementations, the autonomous platform can utilize the sensor data 204 for sensors that are remote from (e.g., offboard) the autonomous platform. This can include, for example, sensor data 204 captured by a different autonomous platform.

Some or all of the sensors 202 can have a sensing cycle. For example, a LIDAR sensor or sensors can scan a certain area during a particular sensing cycle to detect an object or an environment in the area. In some versions of those implementations, a given instance of the LIDAR data can include the LIDAR data from a given sensing cycle of a LIDAR sensor or sensors. For example, a given LIDAR data instance may correspond to a given sweep of the LIDAR sensor or sensors generated during the sensing cycle of the LIDAR sensor or sensors.

The LIDAR data generated during the sensing cycle of a LIDAR sensor or sensors can include, for example, a plurality of points reflected off of a surface of an object in an environment of the autonomous platform, and detected by at least one receiver component of the LIDAR sensor or sensors as data points. During a given sensing cycle, the LIDAR sensor or sensors can detect a plurality of data points in an area of the environment of the autonomous platform. One or more of the data points may also be captured in subsequent sensing cycles. Accordingly, the range and velocity for a point that is indicated by the LIDAR data sweep of the LIDAR sensor or sensors can be based on multiple sensing cycle events by referencing prior (and optionally subsequent) sensing cycle events. In some versions of those implementations, multiple (e.g., all) sensing cycles can have the same duration, the same field-of-view, and/or the same pattern of wave form distribution (through directing of the wave form during the sensing cycle). For example, multiple sweeps can have the same duration (e.g., 50 ms, 100 ms, 200 ms, 300 ms, or other durations) and the same field-of-view (e.g., 60°, 90°, 180°, 360°, or other fields-of-view). Also, in some implementations, sensors 202 other than LIDAR sensors may similarly have a sensing cycle similar to the example sensing cycles for LIDAR sensors described herein.

The autonomy system 200 can obtain the map data 210 associated with an environment in which the autonomous platform was, is, or will be located. The map data 210 can provide information about an environment or a geographic area. For example, the map data 210 can provide information regarding the identity and location of different travel ways (e.g., roadways, etc.), travel way segments (e.g., road segments, etc.), buildings, or other items or objects (e.g., lampposts, crosswalks, curbs, etc.); the location and directions of boundaries or boundary markings (e.g., the location and direction of traffic lanes, parking lanes, turning lanes, bicycle lanes, other lanes, etc.); traffic control data (e.g., the location and instructions of signage, traffic lights, other traffic control devices, etc.); obstruction information (e.g., temporary or permanent blockages, etc.); event data (e.g., road closures/traffic rule alterations due to parades, concerts, sporting events, etc.); nominal vehicle path data (e.g., indicating an ideal vehicle path such as along the center of a certain lane, etc.); or any other map data that provides information that assists an autonomous platform in understanding its surrounding environment and its relationship thereto. In some implementations, the map data 210 can include high-definition map information. Additionally, or alternatively, the map data 210 can include sparse map data (e.g., lane graphs, etc.). In some implementations, the sensor data 204 can be fused with or used to update the map data 210 in real-time.

The autonomy system 200 can include the localization system 230, which can provide an autonomous platform with an understanding of its location and orientation in an environment. In some examples, the localization system 230 can support one or more other subsystems of the autonomy system 200, such as by providing a unified local reference frame for performing, e.g., perception operations, planning operations, or control operations.

In some implementations, the localization system 230 can determine a current position of the autonomous platform. A current position can include a global position (e.g., respecting a georeferenced anchor, etc.) or relative position (e.g., respecting objects in the environment, etc.). The localization system 230 can generally include or interface with any device or circuitry for analyzing a position or change in position of an autonomous platform (e.g., autonomous ground-based vehicle, etc.). For example, the localization system 230 can determine position by using one or more of: inertial sensors (e.g., inertial measurement unit(s), etc.), a satellite positioning system, radio receivers, networking devices (e.g., based on IP address, etc.), triangulation or proximity to network access points or other network components (e.g., cellular towers, Wi-Fi access points, etc.), or other suitable techniques. The position of the autonomous platform can be used by various subsystems of the autonomy system 200 or provided to a remote computing system (e.g., using the communication interface(s) 206).

In some implementations, the localization system 230 can register relative positions of elements of a surrounding environment of an autonomous platform with recorded positions in the map data 210. For instance, the localization system 230 can process the sensor data 204 (e.g., LIDAR data, RADAR data, camera data, etc.) for aligning or otherwise registering to a map of the surrounding environment (e.g., from the map data 210) to understand the autonomous platform's position within that environment. Accordingly, in some implementations, the autonomous platform can identify its position within the surrounding environment (e.g., across six axes, etc.) based on a search over the map data 210. In some implementations, given an initial location, the localization system 230 can update the autonomous platform's location with incremental re-alignment based on recorded or estimated deviations from the initial location. In some implementations, a position can be registered directly within the map data 210.

In some implementations, the map data 210 can include a large volume of data subdivided into geographic tiles, such that a desired region of a map stored in the map data 210 can be reconstructed from one or more tiles. For instance, a plurality of tiles selected from the map data 210 can be stitched together by the autonomy system 200 based on a position obtained by the localization system 230 (e.g., a number of tiles selected in the vicinity of the position).

In some implementations, the localization system 230 can determine positions (e.g., relative or absolute) of one or more attachments or accessories for an autonomous platform. For instance, an autonomous platform can be associated with a cargo platform, and the localization system 230 can provide positions of one or more points on the cargo platform. For example, a cargo platform can include a trailer or other device towed or otherwise attached to or manipulated by an autonomous platform, and the localization system 230 can provide for data describing the position (e.g., absolute, relative, etc.) of the autonomous platform as well as the cargo platform. Such information can be obtained by the other autonomy systems to help operate the autonomous platform.

The autonomy system 200 can include the perception system 240, which can allow an autonomous platform to detect, classify, and track objects and actors in its environment. Environmental features or objects perceived within an environment can be those within the field of view of the sensor(s) 202 or predicted to be occluded from the sensor(s) 202. This can include object(s) not in motion or not predicted to move (static objects) or object(s) in motion or predicted to be in motion (dynamic objects/actors).

The perception system 240 can determine one or more states (e.g., current or past state(s), etc.) of one or more objects that are within a surrounding environment of an autonomous platform. For example, state(s) can describe (e.g., for a given time, time period, etc.) an estimate of an object's current or past location (also referred to as position); current or past speed/velocity; current or past acceleration; current or past heading; current or past orientation; size/footprint (e.g., as represented by a bounding shape, object highlighting, etc.); classification (e.g., pedestrian class vs. vehicle class vs. bicycle class, etc.); the uncertainties associated therewith; or other state information. In some implementations, the perception system 240 can determine the state(s) using one or more algorithms or machine-learned models configured to identify/classify objects based on inputs from the sensor(s) 202. The perception system 240 can use different modalities of the sensor data 204 to generate a representation of the environment to be processed by the one or more algorithms or machine-learned model. In some implementations, state(s) for one or more identified or unidentified objects can be maintained and updated over time as the autonomous platform continues to perceive or interact with the objects (e.g., maneuver with or around, yield to, etc.). In this manner, the perception system 240 can provide an understanding about a current state of an environment (e.g., including the objects therein, etc.) informed by a record of prior states of the environment (e.g., including movement histories for the objects therein). Such information can be helpful as the autonomous platform plans its motion through the environment.

The autonomy system 200 can include the planning system 250, which can be configured to determine how the autonomous platform is to interact with and move within its environment. The planning system 250 can determine one or more motion plans for an autonomous platform. A motion plan can include one or more trajectories (e.g., motion trajectories) that indicate a path for an autonomous platform to follow. A trajectory can be of a certain length or time range. The length or time range can be defined by the computational planning horizon of the planning system 250. A motion trajectory can be defined by one or more waypoints (with associated coordinates). The waypoint(s) can be future location(s) for the autonomous platform. The motion plans can be continuously generated, updated, and considered by the planning system 250.

The motion planning system 250 can determine a strategy for the autonomous platform. A strategy may be a set of discrete decisions (e.g., yield to actor, reverse yield to actor, merge, lane change) that the autonomous platform makes. The strategy may be selected from a plurality of potential strategies. The selected strategy may be a lowest cost strategy as determined by one or more cost functions. The cost functions may, for example, evaluate the probability of a collision with another actor or object.

The planning system 250 can determine a desired trajectory for executing a strategy. For instance, the planning system 250 can obtain one or more trajectories for executing one or more strategies. The planning system 250 can evaluate trajectories or strategies (e.g., with scores, costs, rewards, constraints, etc.) and rank them. For instance, the planning system 250 can use forecasting output(s) that indicate interactions (e.g., proximity, intersections, etc.) between trajectories for the autonomous platform and one or more objects to inform the evaluation of candidate trajectories or strategies for the autonomous platform. In some implementations, the planning system 250 can utilize static cost(s) to evaluate trajectories for the autonomous platform (e.g., "avoid lane boundaries," "minimize jerk," etc.). Additionally, or alternatively, the planning system 250 can utilize dynamic cost(s) to evaluate the trajectories or strategies for the autonomous platform based on forecasted outcomes for the current operational scenario (e.g., forecasted trajectories or strategies leading to interactions between actors, forecasted trajectories or strategies leading to interactions between actors and the autonomous platform, etc.). The planning system 250 can rank trajectories based on one or more static costs, one or more dynamic costs, or a combination thereof. The planning system 250 can select a motion plan (and a corresponding trajectory) based on a ranking of a plurality of candidate trajectories. In some implementations, the planning system 250 can select a highest ranked candidate, or a highest ranked feasible candidate.

The planning system 250 can then validate the selected trajectory against one or more constraints before the trajectory is executed by the autonomous platform.

To help with its motion planning decisions, the planning system 250 can be configured to perform a forecasting function. The planning system 250 can forecast future state(s) of the environment. This can include forecasting the future state(s) of other actors in the environment. In some implementations, the planning system 250 can forecast future state(s) based on current or past state(s) (e.g., as developed or maintained by the perception system 240). In some implementations, future state(s) can be or include forecasted trajectories (e.g., positions over time) of the objects in the environment, such as other actors. In some implementations, one or more of the future state(s) can include one or more probabilities associated therewith (e.g., marginal probabilities, conditional probabilities). For example, the one or more probabilities can include one or more probabilities conditioned on the strategy or trajectory options available to the autonomous platform. Additionally, or alternatively, the probabilities can include probabilities conditioned on trajectory options available to one or more other actors.

In some implementations, the planning system 250 can perform interactive forecasting. The planning system 250 can determine a motion plan for an autonomous platform with an understanding of how forecasted future states of the environment can be affected by execution of one or more candidate motion plans. By way of example, with reference again to FIG. 1, the autonomous platform 110 can determine candidate motion plans corresponding to a set of platform trajectories 112A-C that respectively correspond to the first actor trajectories 122A-C for the first actor 120, trajectories 132 for the second actor 130, and trajectories 142 for the third actor 140 (e.g., with respective trajectory correspondence indicated with matching line styles). For instance, the autonomous platform 110 (e.g., using its autonomy system 200) can forecast that a platform trajectory 112A to more quickly move the autonomous platform 110 into the area in front of the first actor 120 is likely associated with the first actor 120 decreasing forward speed and yielding more quickly to the autonomous platform 110 in accordance with first actor trajectory 122A. Additionally, or alternatively, the autonomous platform 110 can forecast that a platform trajectory 112B to gently move the autonomous platform 110 into the area in front of the first actor 120 is likely associated with the first actor 120 slightly decreasing speed and yielding slowly to the autonomous platform 110 in accordance with first actor trajectory 122B. Additionally, or alternatively, the autonomous platform 110 can forecast that a platform trajectory 112C to remain in a parallel alignment with the first actor 120 is likely associated with the first actor 120 not yielding any distance to the autonomous platform 110 in accordance with first actor trajectory 122C. Based on comparison of the forecasted scenarios to a set of desired outcomes (e.g., by scoring scenarios based on a cost or reward), the planning system 250 can select a motion plan (and its associated trajectory) in view of the autonomous platform's interaction with the environment 100. In this manner, for example, the autonomous platform 110 can interleave its forecasting and motion planning functionality.

To implement selected motion plan(s), the autonomy system 200 can include a control system 260 (e.g., a vehicle control system). Generally, the control system 260 can provide an interface between the autonomy system 200 and the platform control devices 212 for implementing the strategies and motion plan(s) generated by the planning system 250. For instance, the control system 260 can implement the selected motion plan/trajectory to control the autonomous platform's motion through its environment by following the selected trajectory (e.g., the waypoints included therein). The control system 260 can, for example, translate a motion plan into instructions for the appropriate platform control devices 212 (e.g., acceleration control, brake control, steering control, etc.). By way of example, the control system 260 can translate a selected motion plan into instructions to adjust a steering component (e.g., a steering angle) by a certain number of degrees, apply a certain magnitude of braking force, increase/decrease speed, etc. In some implementations, the control system 260 can communicate with the platform control devices 212 through communication channels including, for example, one or more data buses (e.g., controller area network (CAN), etc.), onboard diagnostics connectors (e.g., OBD-II, etc.), or a combination of wired or wireless communication links. The platform control devices 212 can send or obtain data, messages, signals, etc. to or from the autonomy system 200 (or vice versa) through the communication channel(s).

The autonomy system 200 can receive, through communication interface(s) 206, assistive signal(s) from remote assistance system 270. Remote assistance system 270 can communicate with the autonomy system 200 over a network (e.g., as a remote system 160 over network 170). In some implementations, the autonomy system 200 can initiate a communication session with the remote assistance system 270. For example, the autonomy system 200 can initiate a session based on or in response to a trigger. In some implementations, the trigger may be an alert, an error signal, a map feature, a request, a location, a traffic condition, a road condition, etc.

After initiating the session, the autonomy system 200 can provide context data to the remote assistance system 270. The context data may include sensor data 204 and state data of the autonomous platform. For example, the context data may include a live camera feed from a camera of the autonomous platform and the autonomous platform's current speed. An operator (e.g., human operator) of the remote assistance system 270 can use the context data to select assistive signals. The assistive signal(s) can provide values or adjustments for various operational parameters or characteristics for the autonomy system 200. For instance, the assistive signal(s) can include way points (e.g., a path around an obstacle, lane change, etc.), velocity or acceleration profiles (e.g., speed limits, etc.), relative motion instructions (e.g., convoy formation, etc.), operational characteristics (e.g., use of auxiliary systems, reduced energy processing modes, etc.), or other signals to assist the autonomy system 200.

The autonomy system 200 can use the assistive signal(s) for input into one or more autonomy subsystems for performing autonomy functions. For instance, the planning system 250 can receive the assistive signal(s) as an input for generating a motion plan. For example, assistive signal(s) can include constraints for generating a motion plan. Additionally, or alternatively, assistive signal(s) can include cost or reward adjustments for influencing motion planning by the planning system 250. Additionally, or alternatively, assistive signal(s) can be considered by the autonomy system 200 as suggestive inputs for consideration in addition to other received data (e.g., sensor inputs, etc.).

The autonomy system 200 may be platform agnostic, and the control system 260 can provide control instructions to platform control devices 212 for a variety of different platforms for autonomous movement (e.g., a plurality of different autonomous platforms fitted with autonomous control systems). This can include a variety of different types of autonomous vehicles (e.g., sedans, vans, SUVs, trucks, electric vehicles, combustion power vehicles, etc.) from a variety of different manufacturers/developers that operate in various different environments and, in some implementations, perform one or more vehicle services.

Figure 3A:
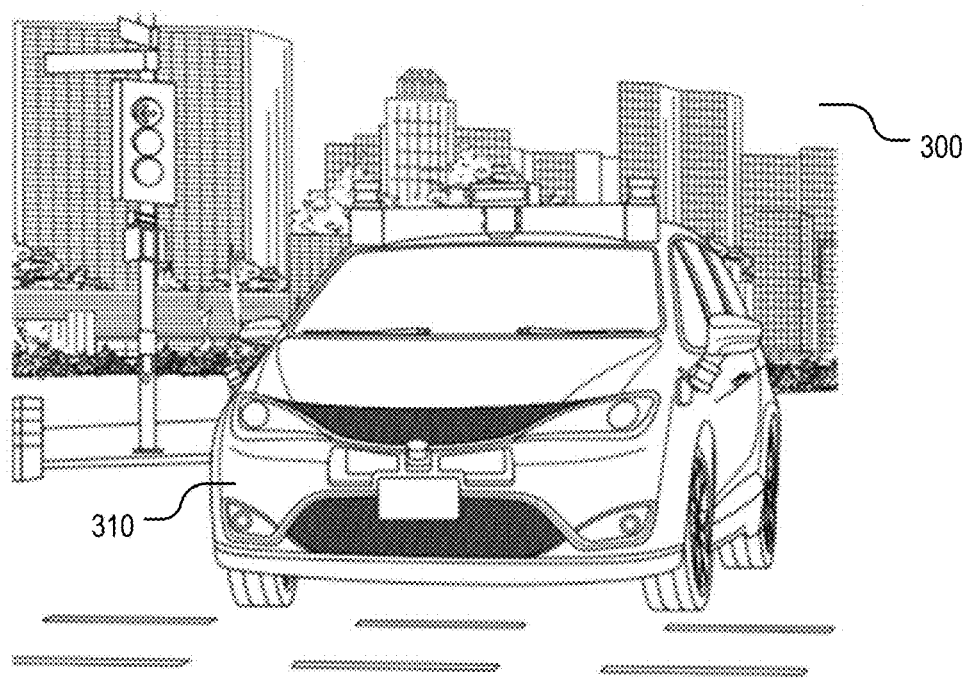
FIG. 3A shows an example environment including an example autonomous vehicle.

For example, with reference to FIG. 3A, an operational environment can include a dense environment 300. An autonomous platform can include an autonomous vehicle 310 controlled by the autonomy system 200. In some implementations, the autonomous vehicle 310 can be configured for maneuverability in a dense environment, such as with a configured wheelbase or other specifications. In some implementations, the autonomous vehicle 310 can be configured for transporting cargo or passengers. In some implementations, the autonomous vehicle 310 can be configured to transport numerous passengers (e.g., a passenger van, a shuttle, a bus, etc.). In some implementations, the autonomous vehicle 310 can be configured to transport cargo, such as large quantities of cargo (e.g., a truck, a box van, a step van, etc.) or smaller cargo (e.g., food, personal packages, etc.).

Figure 3B:
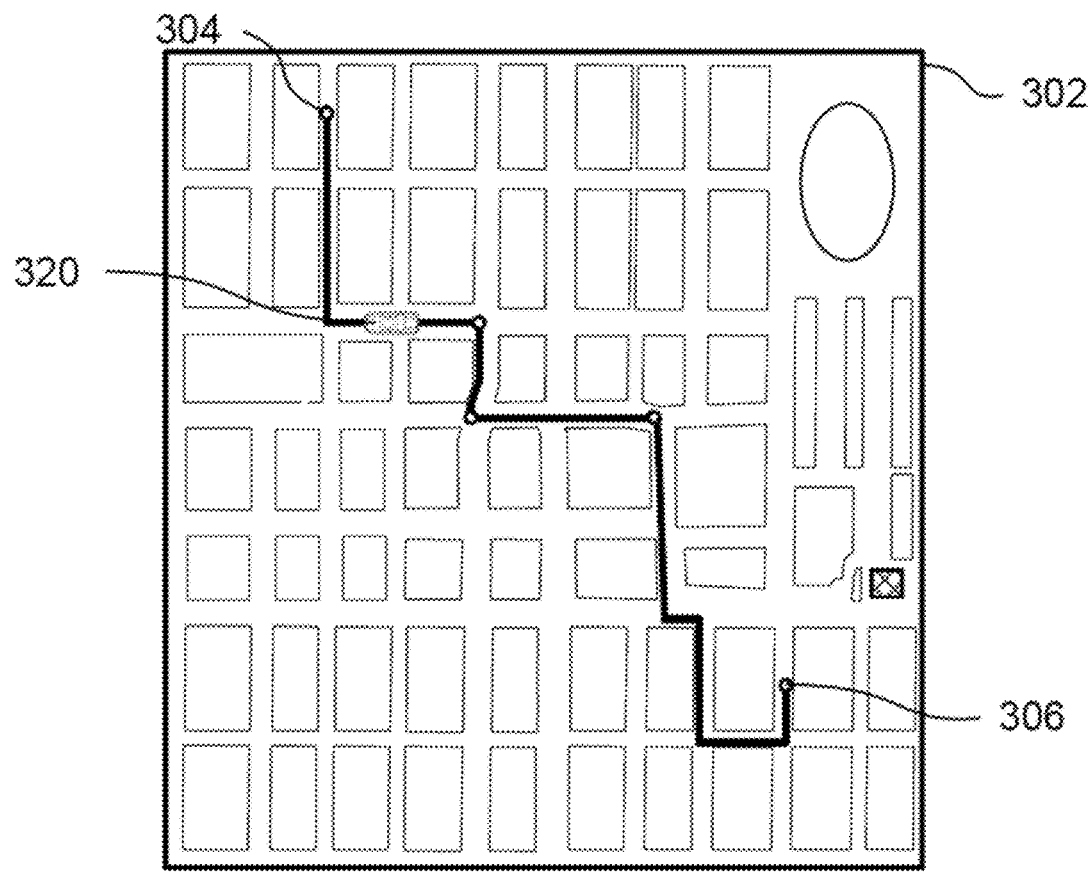
FIG. 3B is an overhead view of the example environment of FIG. 3A.

With reference to FIG. 3B, a selected overhead view 302 of the dense environment 300 is shown overlaid with an example trip/service between a first location 304 and a second location 306. The example trip/service can be assigned, for example, to an autonomous vehicle 320 by a remote computing system. The autonomous vehicle 320 can be, for example, the same type of vehicle as autonomous vehicle 310. The example trip/service can include transporting passengers or cargo between the first location 304 and the second location 306. In some implementations, the example trip/service can include travel to or through one or more intermediate locations, such as to onload or offload passengers or cargo. In some implementations, the example trip/service can be prescheduled (e.g., for regular traversal, such as on a transportation schedule). In some implementations, the example trip/service can be on-demand (e.g., as requested by or for performing a taxi, rideshare, ride hailing, courier, delivery service, etc.).

Figure 3C:
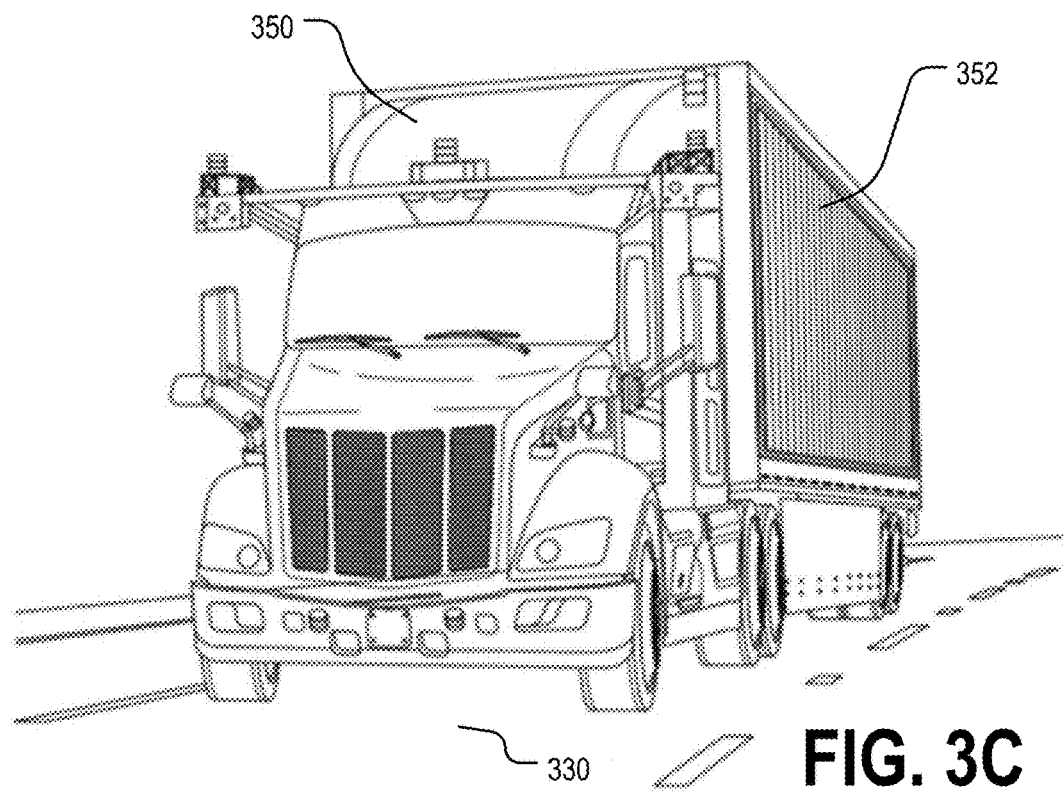
FIG. 3C shows another example environment including another example autonomous vehicle.

With reference to FIG. 3C, in another example, an operational environment can include an open travel way environment 330. An autonomous platform can include an autonomous vehicle 350 controlled by the autonomy system 200. This can include an autonomous tractor for an autonomous truck. In some implementations, the autonomous vehicle 350 can be configured for high payload transport (e.g., transporting freight or other cargo or passengers in quantity), such as for long distance, high payload transport. For instance, the autonomous vehicle 350 can include one or more cargo platform attachments such as a trailer 352. Although depicted as a towed attachment in FIG. 3C, in some implementations one or more cargo platforms can be integrated into (e.g., attached to the chassis of, etc.) the autonomous vehicle 350 (e.g., as in a box van, step van, etc.).

Figure 3D:
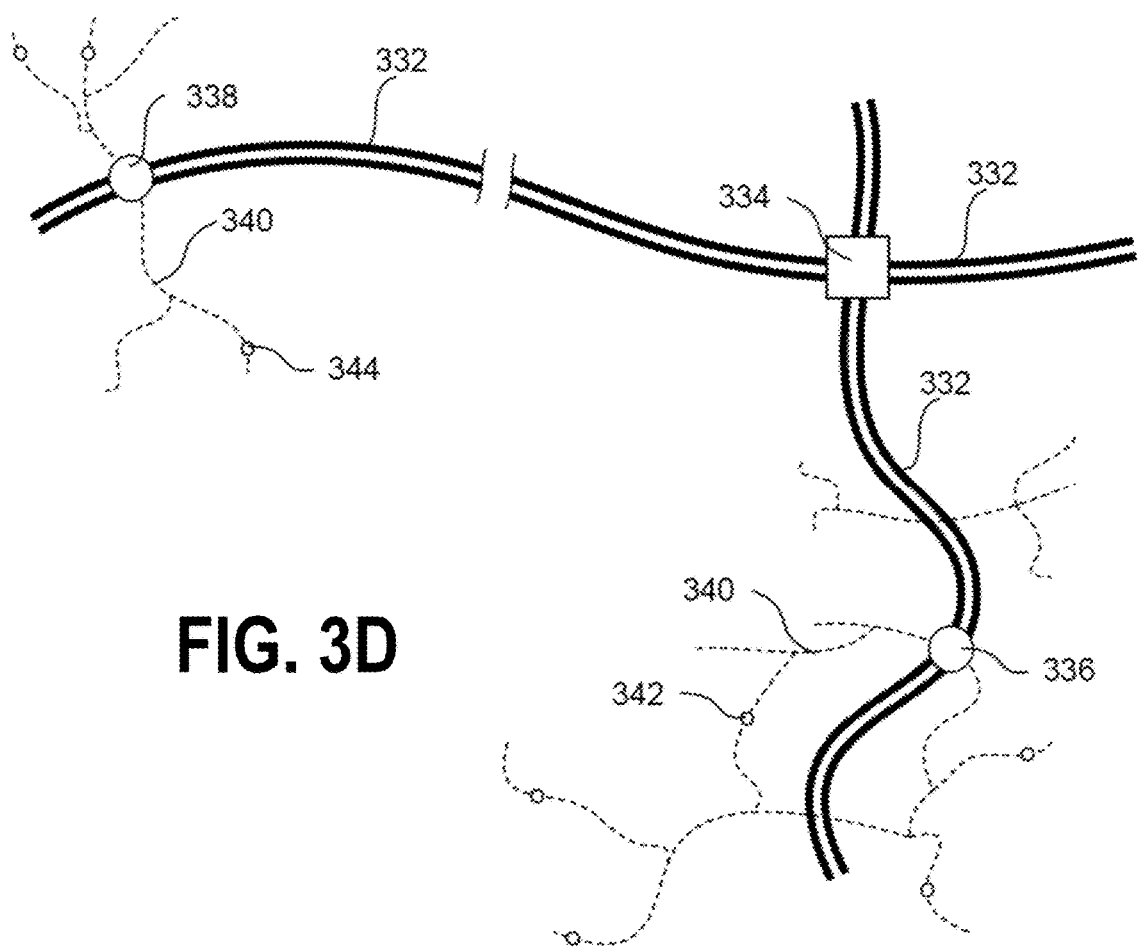
FIG. 3D is an overhead view of the example environment of FIG. 3C.

With reference to FIG. 3D, a selected overhead view of open travel way environment 330 is shown, including travel ways 332, an interchange 334, transfer hubs 336 and 338, access travel ways 340, and locations 342 and 344. In some implementations, an autonomous vehicle (e.g., the autonomous vehicle 310 or the autonomous vehicle 350) can be assigned an example trip/service to traverse the one or more travel ways 332 (optionally connected by the interchange 334) to transport cargo between the transfer hub 336 and the transfer hub 338. For instance, in some implementations, the example trip/service includes a cargo delivery/transport service, such as a freight delivery/transport service. The example trip/service can be assigned by a remote computing system. In some implementations, the transfer hub 336 can be an origin point for cargo (e.g., a depot, a warehouse, a facility, etc.) and the transfer hub 338 can be a destination point for cargo (e.g., a retailer, etc.). However, in some implementations, the transfer hub 336 can be an intermediate point along a cargo item's ultimate journey between its respective origin and its respective destination. For instance, a cargo item's origin can be situated along the access travel ways 340 at the location 342. The cargo item can accordingly be transported to the transfer hub 336 (e.g., by a human-driven vehicle, by the autonomous vehicle 310, etc.) for staging. At the transfer hub 336, various cargo items can be grouped or staged for longer distance transport over the travel ways 332.

In some implementations of an example trip/service, a group of staged cargo items can be loaded onto an autonomous vehicle (e.g., the autonomous vehicle 350) for transport to one or more other transfer hubs, such as the transfer hub 338. For instance, although not depicted, it is to be understood that the open travel way environment 330 can include more transfer hubs than the transfer hubs 336 and 338 and can include more travel ways 332 interconnected by more interchanges 334. A simplified map is presented here for purposes of clarity only. In some implementations, one or more cargo items transported to the transfer hub 338 can be distributed to one or more local destinations (e.g., by a human-driven vehicle, by the autonomous vehicle 310, etc.), such as along the access travel ways 340 to the location 344. In some implementations, the example trip/service can be prescheduled (e.g., for regular traversal, such as on a transportation schedule). In some implementations, the example trip/service can be on-demand (e.g., as requested by or for performing a chartered passenger transport or freight delivery service).

To improve the performance of an autonomous platform, such as an autonomous vehicle controlled at least in part using autonomy system 200 (e.g., the autonomous vehicles 310 or 350), various examples described herein utilize blind spot monitoring. In some arrangements, the field-of-view of some or all of the sensors 202 of an autonomous platform may be obstructed during use. This may create blind spots.

Blind spots can create challenges for autonomous platforms. For example, during operation of the autonomous platform, actors may enter and/or exit the blind spot. When an actor is present in the blind spot, sensor data 204 may not provide sufficient information about the actor. This may make it difficult for the autonomous platform to determine actor trajectories and/or actor states for the actor, thus complicating the process of determining motion plans for the autonomous platform.

One example type of autonomous platform that may be subject to sensor blind spots is an autonomous vehicle including an autonomous tractor that pulls a trailer. For example, an autonomous tractor may have sensors 202 positioned on the autonomous tractor. When a trailer is coupled to the autonomous tractor, the trailer may obstruct the field-of-view of one or more of the sensors 202, thus causing a blind spot. Further, a trailer coupled to an autonomous tractor by a hitch may move as the autonomous tractor maneuvers. For example, if the autonomous tractor is turning, the position of the trailer relative to the sensors 202 may change. This may also change the location and size of the blind spot.

Various examples described herein are directed to systems and methods for controlling an autonomous vehicle while considering at least one vehicle blind spot. For example, the autonomous vehicle (e.g., an autonomy system thereof) may access sensor position data describing the position of at least one sensor on the autonomous vehicle and actor position data describing the position of an actor in the environment of the autonomous vehicle. Using the position of at least one sensor and the position of the actor, the autonomous vehicle may determine whether the actor is present in a blind spot of the autonomous vehicle. Upon determining that the actor is present in the blind spot of the autonomous vehicle, the autonomous vehicle may determine a motion plan that considers the presence of the actor in the blind spot. The autonomous vehicle may execute the motion plan to maneuver in the environment.

Figure 4:
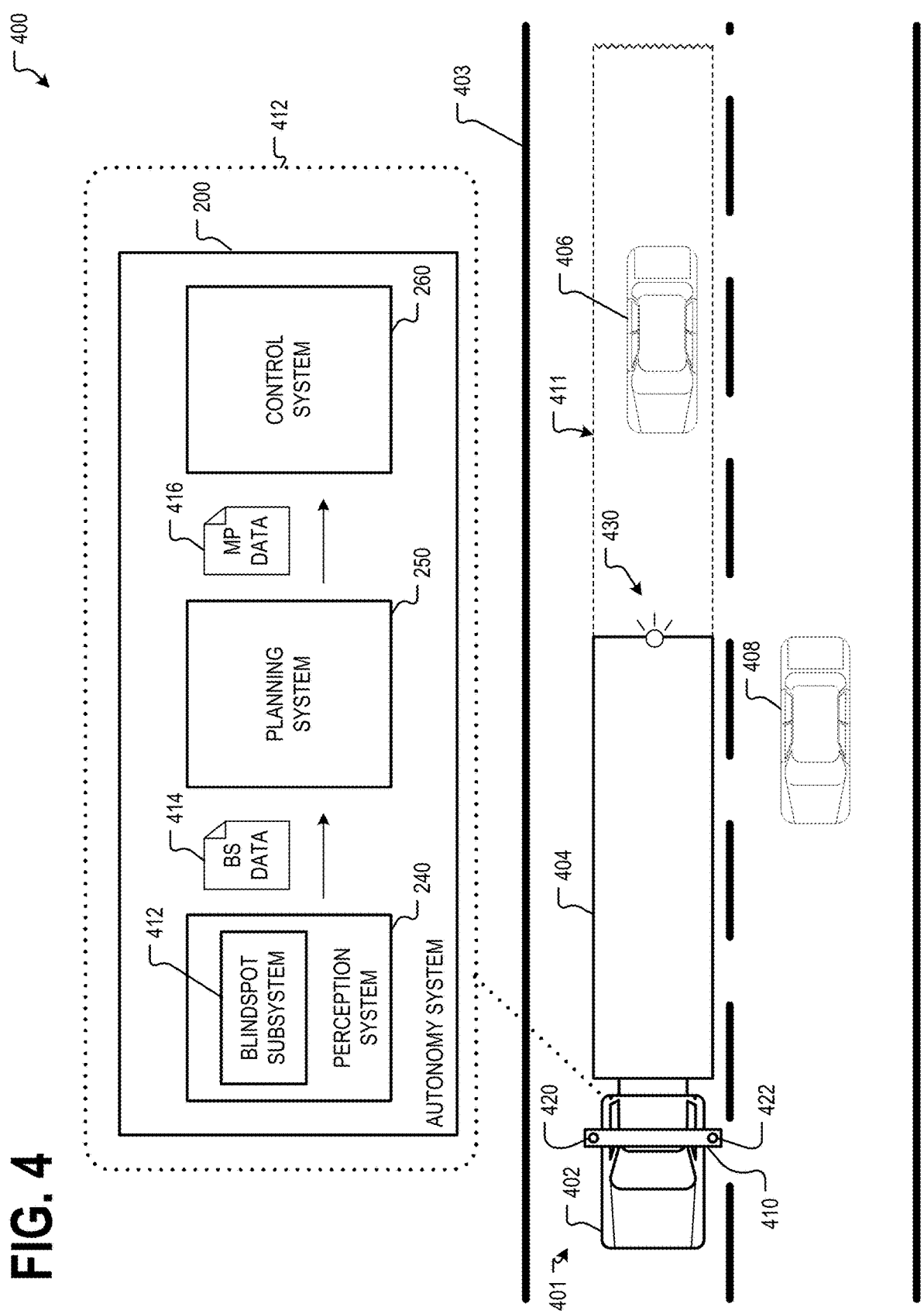
FIG. 4 is a diagram showing one example of an environment including an autonomous vehicle traveling on a travel way.

FIG. 4 is a diagram showing one example of an environment 400 including an autonomous vehicle 401 traveling on a travel way 403. The autonomous vehicle 401 comprises an autonomous tractor 402 and a trailer 404. The autonomous tractor 402 comprises a sensor assembly 410 that may include one or more sensors 420, 422. The sensors 420, 422 may be or include any suitable sensors or sensor types. In some examples the sensors 420, 422 may be arranged in a manner similar to that described with respect to the sensors 202 described herein with respect to FIG. 2. For example, the sensors 420, 422 may generate sensor data similar to the sensor data 204 also described with respect to FIG. 2. Although two sensors 420, 422 are shown in FIG. 4, it will be appreciated that autonomous vehicles may include more or fewer than two sensors.

The autonomous tractor 402 comprises an autonomy system 200, for example, as described with respect to FIG. 2. FIG. 4 illustrates a blind spot 411. In the example of FIG. 4, the blind spot 411 results from the trailer 404 obstructing the field-of-view of the sensors 420, 422. In some examples, the blind spot 411 is a portion of the environment 400 that is not observable by either of the sensors 420, 422. For example, portions of the environment 400 that are occluded with respect to one of the sensors 420, 422 but not the other may not be part of the blind spot 411. In other example implementations, the blind spot 411 may include portions of the environment 400 that are occluded with respect to one of the sensors 420, 422 but not the other sensor.

Actors 406 and 408 are also shown on the travel way 403. In the example of FIG. 4, the actors 408, 406 are cars. It will be appreciated, however, that an autonomous vehicle, such as the autonomous vehicle 401, may encounter other types of actors on the travel way 403 and/or on other travel ways. Other types of actors (not shown in FIG. 4) may include other types of vehicles such as buses, trucks, motorcycles, and the like. Other types of actors (not shown in FIG. 4) may also include animals, pedestrians, debris, and/or other obstacles present on the travel way 403.

In the example of FIG. 4, the actor 408 is shown outside of the blind spot 411 of the autonomous vehicle 401. Accordingly, the actor 408 may be observable by at least one of the sensors 420, 422 positioned at the sensor assembly 410. Accordingly, sensor data 204 generated by the sensors 420, 422 may directly or indirectly include information that can be used by the perception system 240 to determine properties of the actor 408 such as a position of the actor 408, a trajectory of the actor 408, a velocity of the actor 408, an acceleration of the actor 408, and the like.

In contrast, because the actor 406 is present in the blind spot 411, it may not be observable by the sensors 420, 422. As a result, sensor data 204 generated by the sensors 420, 422 may lack information that can be used by the perception system 240 to derive some or all of the properties of the actor 406. This, in turn, may limit how the presence of the actor 406 is taken into account when determining a motion plan for the autonomous vehicle 401.

In some examples, the perception system 240 may implement a blind spot subsystem 412 to monitor and/or track actors in the blind spot 411. The blind spot subsystem 412 may comprise hardware and/or software components to monitor the presence of actors in the blind spot 411. The blind spot subsystem 412 may generate blind spot data 414. The blind spot data 414 may describe one or more actors in the blind spot 411. In an example implementation, the blind spot data 414 comprises a flag or other binary indicator describing whether there are any actors in the blind spot 411. Optionally, the blind spot data 414 may indicate a number of actors believed to be in the blind spot 411. In some examples, the blind spot data 414 may also describe a position of the blind spot 411 or an estimated or worst-case position of an actor in the blind spot 411.

The blind spot data 414 may be provided to the planning system 250. The planning system 250 may consider the blind spot data 414 to generate motion plan data 416. The motion plan data 416 may describe at least one motion plan for the autonomous vehicle 401 considering the presence of at least one actor, such as the actor 406, in the blind spot 411. The motion plan data 416 may be provided to the control system 260, which may control the autonomous vehicle 401 in accordance with one or more motion plans described by the motion plan data 416.

In some implementations, the blind spot subsystem 412 monitors the blind spot 411 using a pose instance of the trailer 404. The pose instance of the trailer 404 describes the position and, in some examples, the orientation of the trailer 404 at a particular time or instance. For example, a pose instance for the trailer 404 may indicate positions of one or more corners of the trailer 404. A pose instance of the trailer 404, in some examples, is determined by the perception system 240 using sensor data 204.

In some examples, a pose instance of the trailer 404 is determined based on a corresponding pose instance of the autonomous tractor 402. The pose instance of the autonomous tractor 402 may be generated, for example, by the localization system 230. In some examples the pose instance of the autonomous tractor 402 is determined from sensor data 204 including, for example, IMU data, inclinometer data, odometer data, location or positioning device data, wheel encoder data, and/or the like. Also, in some examples the pose instance for the autonomous tractor 402 can be determined using LIDAR data or other data generated by image capturing devices.

The perception system 240 may receive a tractor pose instance and generate a corresponding trailer pose instance based at least in part on the tractor pose instance. For example, the perception system 240 may receive sensor data 204 indicating a position of the tractor 402. The perception system 240 may utilize the sensor data to determine a position of the trailer 404 relative to the autonomous tractor 402. In some implementations, the trailer pose instance can include position and orientation information of the trailer 404, which may be mechanically coupled to the autonomous tractor 402. In some examples, the trailer pose instance can be defined with respect to the same reference frame as the tractor pose instance. Also, in some examples, the trailer pose instance can be defined with respect to the autonomous tractor 402.

The autonomy system 200 (e.g., the blind spot subsystem 412 thereof) may generate the blind spot data 414 in any suitable manner. In some implementations, the blind spot subsystem 412 determines a line from the position of each of the one or more sensors at the sensor assembly 410 to a position of an actor. If the blind spot subsystem 412 determines that all of the lines intersect the trailer 404, as indicated by the trailer pose instance, it may generate blind spot data 414 indicating the presence of at least one actor in the blind spot 411. If the blind spot subsystem 412 determines that the line does not intersect the trailer 404, it may indicate that the actor is not in the blind spot 411.

The autonomy system 200 (e.g., the perception system 240 and/or blind spot subsystem 412 thereof) may determine if the line intersects the trailer 404 using pose data describing a pose instance of the trailer 404. The pose data describing the pose instance of the trailer 404 may be generated from the sensor data 204 describing the environment 400. The pose instance of the trailer 404 may be determined, as described herein, in a common reference frame as a corresponding pose instance for the autonomous tractor 402. Accordingly, the blind spot subsystem 412 may determine a position of the relevant sensor or sensors 420, 422 of the autonomous vehicle 401 and a position of the trailer 404 in the same reference frame.

In some examples, the blind spot data 414 or other data generated by the blind spot subsystem 412 may be used to operate an indicator 430 that may be physically coupled to the trailer 404. The indicator 430 may be visible to vehicles that are present in the blind spot 411, such as the actor 406. The indicator 430 may be or include a light, a display, or any other suitable output device. The indicator may have a first state when the blind spot subsystem 412 does not detect any vehicles in the blind spot 411 and a second state when the blind spot subsystem 412 does detect a vehicle in the blind spot 411. In this way, vehicles in the blind spot 411, such as the actor 406, may be made aware that the autonomous vehicle 401 may not be able to detect them.

Figure 5:
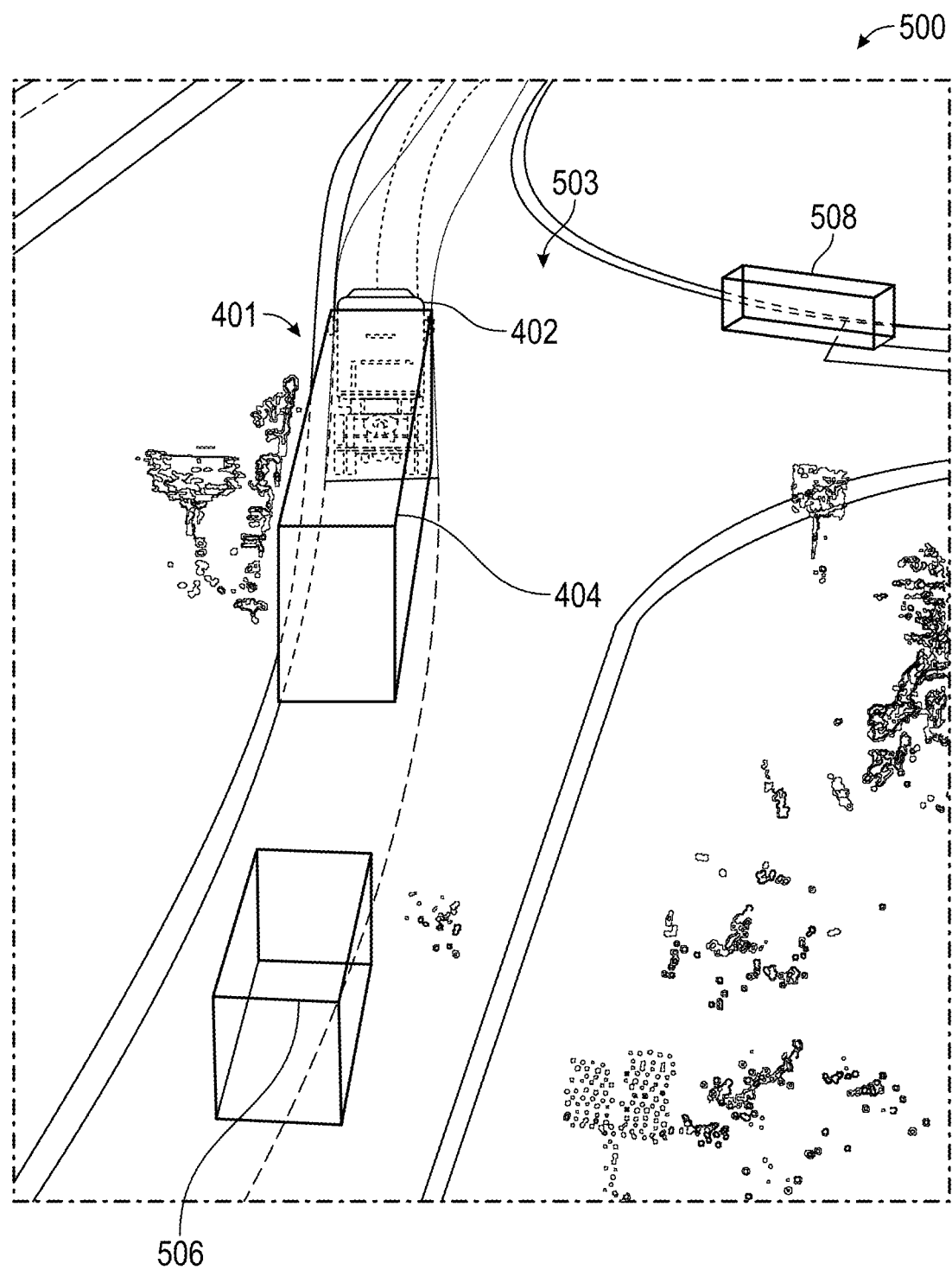
FIG. 5 is a diagram showing another example environment including the autonomous vehicle of FIG. 4.

FIG. 5 is a diagram showing another example environment 500 comprising the autonomous vehicle 401, including the autonomous tractor 402 and the trailer 404. In the example of FIG. 5, the autonomous vehicle 401 is traveling on a roadway 503. Actors 506, 508 are also traveling on the roadway 503. The actors 506, 508 are represented by bounding boxes. In the example depicted, the bounding boxes are rectangular prisms comprising eight corners. For example, the perception system 240 may generate the illustrated bounding boxes around positions indicated by sensor data 204 to include actors 506, 508.

FIG. 5 shows an arrangement in which the autonomous tractor 402 is not traveling straight. In the example of FIG. 5, the autonomous tractor 402 is turning to its left. Accordingly, the trailer 404 is not positioned directly behind the autonomous tractor 402 but is, instead, offset to the left. This may change the position and/or size of the blind spot experienced by the autonomous tractor 402. The blind spot subsystem 412 may take this into account when generating blind spot data 414, for example, as described herein.

Figure 6:
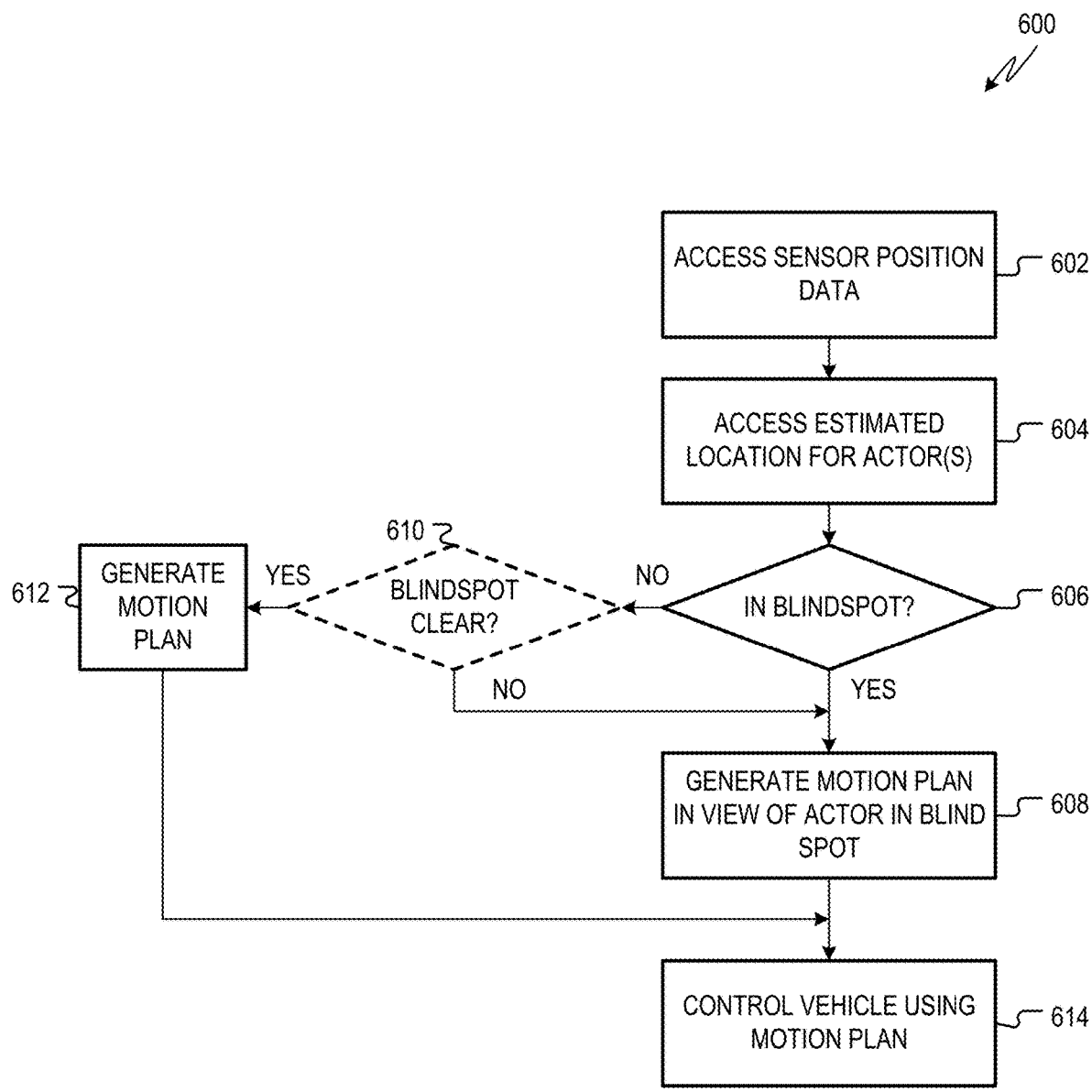
FIG. 6 is a flow chart of a process that may be executed by the autonomy system to control the autonomous tractor considering blind spot data.

FIG. 6 is a flow chart of a process 600 that may be executed by the autonomy system 200 to control the autonomous vehicle 401 considering blind spot data 414, according to some implementations of the present disclosure. In some examples, the process 600 may be executed by the autonomy system 200 periodically, such as, for example, once per sensing cycle.

At operation 602, the autonomy system 200 (e.g., the perception system 240 thereof), receives sensor position data. The sensor position data describes a position of one or more sensors on the autonomous tractor 402. In some examples, the sensor position data is described relative to a pose instance of the autonomous tractor 402. For example, the pose instance of the autonomous tractor 402 may be determined with respect to a center or other reference position of the autonomous tractor 402. The position of the sensor or sensors, indicated by the sensor position data, may be expressed as an offset between the center or other reference position of the autonomous tractor 402 and the position or positions of the respective sensors.

At operation 604, the autonomy system (e.g., the perception system 240 thereof) may access estimated location data describing the estimated location for one or more actors. In some examples, the operation 604 may be executed with respect to a single actor. Also, in some examples, the operation 604 may be executed with respect to more than one actor. For example, the operation 604 may be executed with respect to all actors that are currently being tracked by the perception system 240.

The estimated location for an actor may be determined by the perception system 240 using sensor data 204 generated by sensors 202. It will be appreciated that, in some instances, one or more actors may be present in the blind spot 411 of the autonomous tractor 402. Accordingly, current sensor data 204 may not indicate the location of some or all of the actors. In examples in which current sensor data 204 does not indicate the location of an actor, the perception system 240 may infer the estimated location of the actor from last known state data describing a last known state of that actor. The last known state data for an actor may include, for example, a last known velocity of the actor, a last known acceleration of the actor, a last known trajectory or heading of the actor, and/or a last known orientation of the actor.

In various examples, last known state data describing an actor may be determined from previous sensor data 204, for example, sensor data 204 generated during a previous sensing cycle or sensing cycles. Consider an example in which the actor is outside of the blind spot 411 for multiple sensing cycles and then moves into the blind spot 411 during a last sensing cycle. Sensor data 204 generated during the sensing cycles prior to the last sensing cycle may be used to generate state data for the actor including, for example, a velocity of the actor, an acceleration of the actor, a heading or trajectory of the actor, an orientation or pose of the actor, and/or the like. Because the actor is in the blind spot 411 during the last sensing cycle, sensor data 204 generated during the last sensing cycle may not indicate the actor. Accordingly, during the last sensing cycle, the last known state of the actor may be the state of the actor based on the most recent sensing cycle or cycles when the actor was outside of the blind spot 411.

At operation 606, the blind spot subsystem 412 may determine whether the actor is in the blind spot 411. In some examples, the blind spot subsystem 412 may determine a line from the position of a first sensor, indicated by the sensor position data, to the estimated position of the actor. If the line intersects the trailer 404, as indicated by the trailer pose instance, then the blind spot subsystem 412 may determine that the actor is in the blind spot 411. If the line does not intersect the trailer 404, then the blind spot subsystem 412 may determine that the actor is not in the blind spot 411.

If the blind spot subsystem 412 determines, at operation 606, that the actor is in the blind spot 411, then the blind spot data 414 provided to the planning system 250 may indicate that at least one actor is present in the blind spot 411. For example, the blind spot data 414 may include a flag or other binary indicator. When the actor is present in the blind spot 411, the blind spot subsystem 412 may set or assert the blind spot flag to indicate that an actor is present in the blind spot 411.

At operation 608, the autonomy system 200 (e.g., the planning system 250 thereof) may generate motion plan data 416 reflecting the presence of the actor in the blind spot 411. In some implementations, the planning system 250 generates motion plan data 416 reflecting the presence of an actor in the blind spot 411 by using the blind spot data 414 in at least one cost function used to generate a candidate motion plan, and/or by modifying one or more candidates motion plans.

For example, the planning system 250 may increase the cost of one or more candidate motion plans that are affected by the presence of an actor in the blind spot 411. Consider an example in which a first candidate motion plan involves applying the brakes of the autonomous tractor 402. If an actor is present in the blind spot 411, then applying the brakes of the autonomous tractor 402 may be a less-favored motion plan. Accordingly, the planning system 250 may modify a cost associated with the first candidate motion plan including applying the brakes of the autonomous tractor 402 so as to increase the cost thereof and, thereby, decrease the likelihood that the first candidate motion plan is selected. Consider a second example in which a second candidate motion plan involves changing lanes quickly (e.g., with a high level of speed and/or lateral acceleration). If an actor is present in the blind spot 411, then changing lanes quickly may not be a most favored motion plan. Accordingly, the planning system 250 may modify a cost associated with the second candidate motion plan to increase its cost and thereby reduce the likelihood that the second candidate motion plan is selected.

In addition to, or instead of, modifying one or more costs associated with candidate motion plans, the planning system 250 may modify one or more candidate motion plans to account for the presence of an actor in the blind spot 411. The planning system 250 may modify a candidate motion plan to reduce the likelihood of a negative outcome associated with the actor in the blind spot 411. Consider again the first example above in which the first candidate motion plan involves applying the brakes of the autonomous tractor 402. The planning system 250 may modify the first candidate motion plan to reduce the deceleration, for example, by applying the brakes of the autonomous tractor 402 more gently. Also consider again the second example above in which the second candidate motion plan involves changing lanes quickly. The planning system 250 may modify the second candidate motion plan, for example, to reduce the lateral speed or acceleration of the autonomous vehicle 401 during the lane change.

After a motion plan is generated at operation 608, at operation 614 the autonomy system 200 (e.g., the control system 260 thereof) may control the autonomous tractor 402 using the generated motion plan data 416.

If the blind spot subsystem 412 determines, at operation 606, that the actor is not in the blind spot 411, the blind spot subsystem 412 may, at optional operation 610, determine if the blind spot 411 is clear. For example, even if none of the actors tracked by the perception system 240 during the current sensing cycle are in the blind spot 411, it may be the case that an actor entered the blind spot 411 during a previous sensing cycle. If an actor entered the blind spot 411 during a previous sensing cycle, the blind spot may not be clear. If the blind spot is clear at optional operation 610, the autonomy system 200 (e.g., the planning system 250 thereof) may generate a motion plan at operation 612, as described herein. The autonomy system 200 (e.g., the control system 260 thereof) may control the autonomous tractor 402 using the motion plan data 416 generated at operation 612. On the other hand, if the blind spot 411 is not clear at optional operation 610, then the autonomy system 200 (e.g., the planning system 250 thereof) may generate a motion plan in view of an actor in the blind spot at operation 608, as described herein. It will be appreciated that, in some examples, operation 610 may be omitted. In these examples, if none of the currently tracked actors are in the blind spot 411 at operation 606, then the autonomy system 200 may generate the motion plan at operation 612 as described herein.

Figure 7:
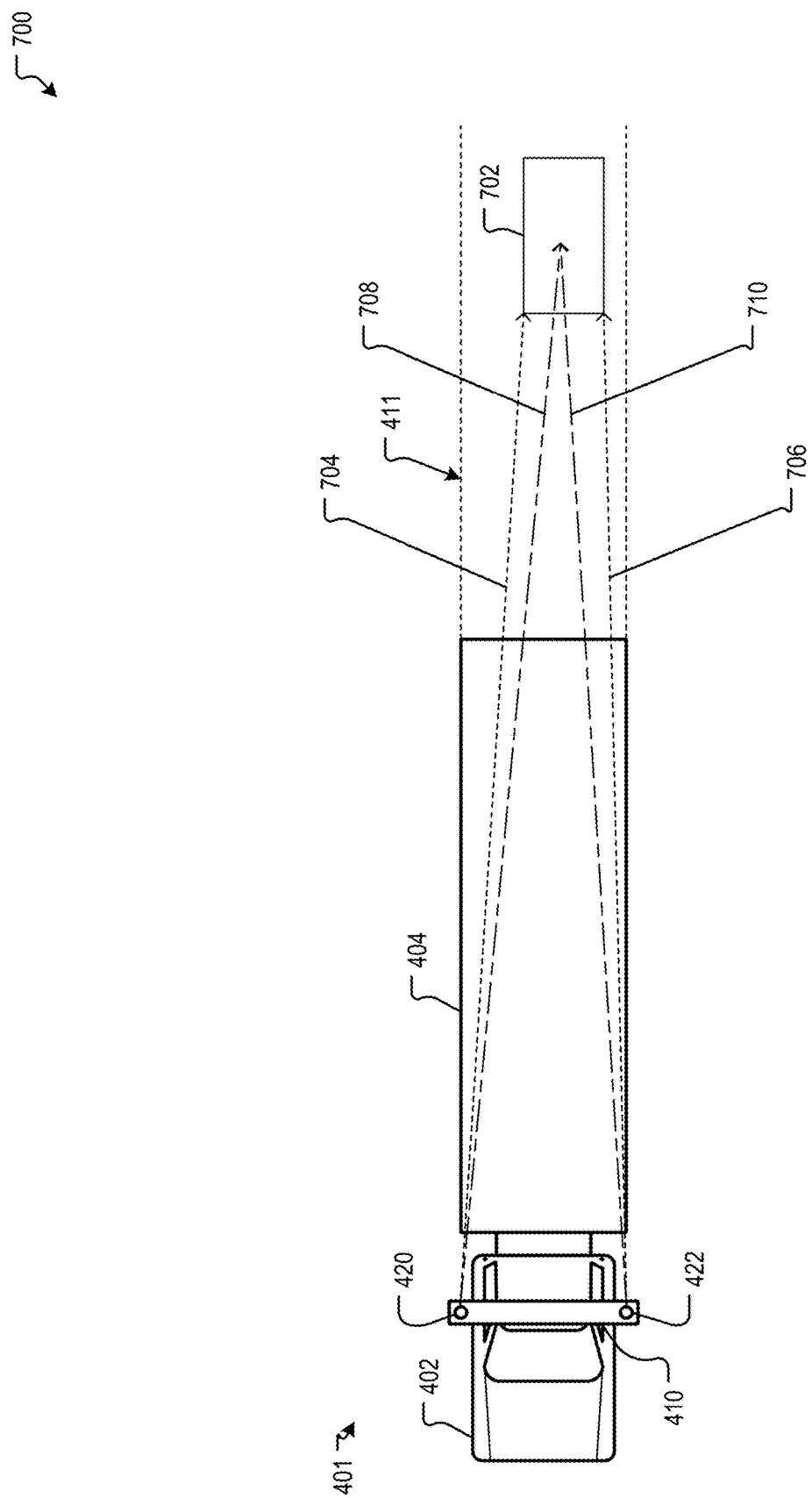
FIG. 7 is a diagram showing an arrangement of the autonomous vehicle of FIG. 4 and an actor.

FIG. 7 is a diagram 700 showing an arrangement of the autonomous vehicle 401 and an actor 702. In the example of FIG. 7, the sensor assembly 410 comprises two sensors 422, 420. The sensor 420 is positioned on the right-hand side of the sensor assembly 410. The sensor 422 is positioned on the left-hand side of the sensor assembly 410.

FIG. 7 shows a line 704 determined from a position of the sensor 420 to an outside corner of the actor 702. The outside corner of the actor 702, in some examples, is an outside corner of a bounding box generated for the actor 702 by the perception system 240, for example, as shown in FIG. 5. The line 704 may be determined by the blind spot subsystem 412. As shown in the example of FIG. 7, the line 704 intersects the trailer 404. FIG. 7 also shows another line 706 determined by the blind spot subsystem 412 from a position of the sensor 422 to an outside corner of the actor 702. In this example, both lines 704, 706 intersect the trailer 404. Accordingly, the actor 702 may be present in the blind spot 411.

FIG. 7 also shows an alternative arrangement in which lines 708, 710 are determined from the positions of the respective sensors 420, 422 to a center of the actor 702. In this case, both of lines 708, 710 intersect the trailer 404, indicating that the actor 702 is in the blind spot 411. In various examples, the blind spot subsystem 412 may determine lines to outside corners of the actor 702, such as lines 704, 706 or to a center of the actor 702, such as lines 708, 710.

Figure 8:
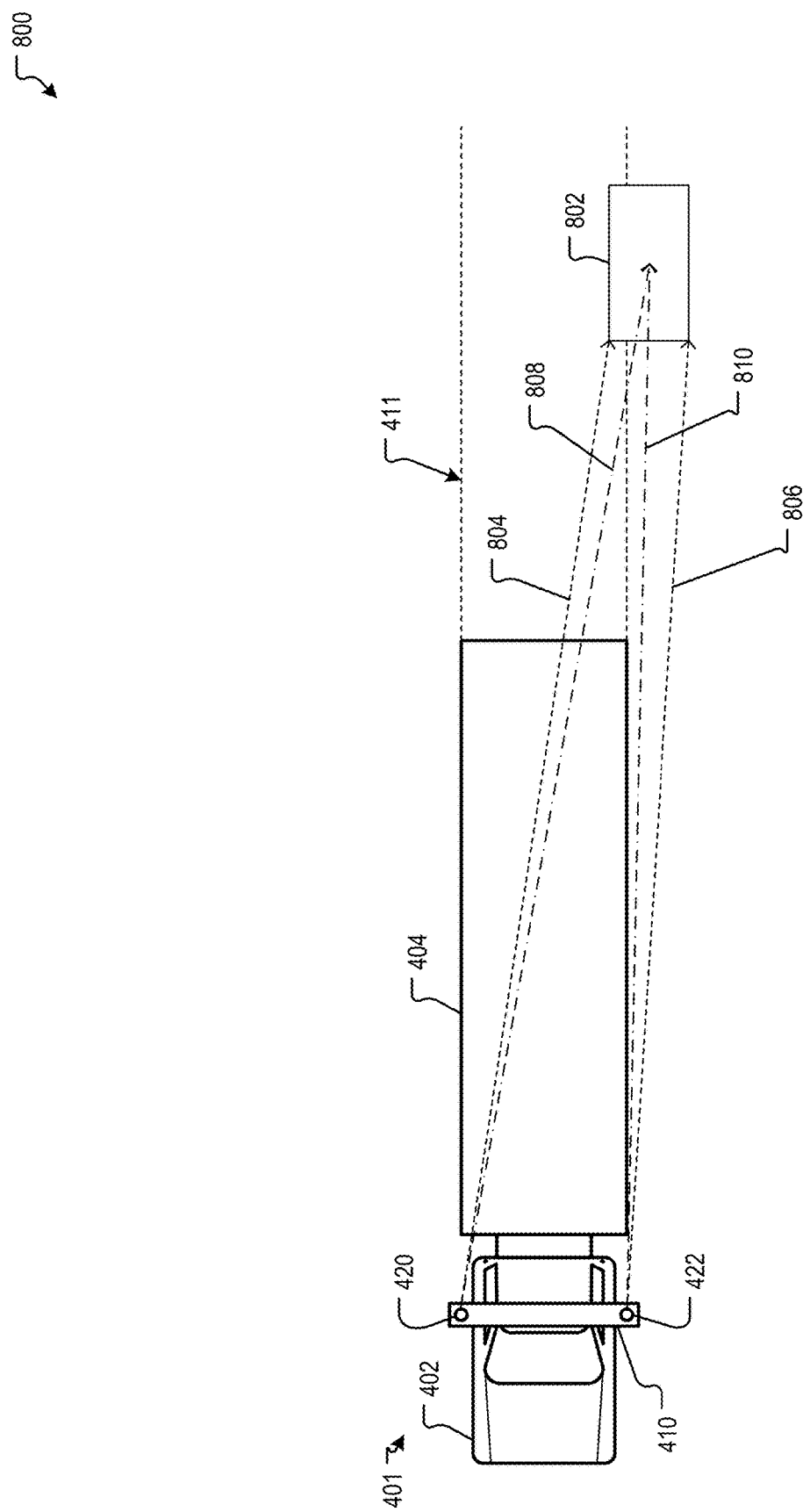
FIG. 8 is a diagram showing another arrangement of the autonomous vehicle of FIG. 4 and an actor in which the actor is not in the blind spot.

FIG. 8 is a diagram 800 showing another arrangement of the autonomous vehicle 401 and an actor 802 in which the actor 802 is not in the blind spot 411. In the example of FIG. 8, the blind spot subsystem 412 may determine a first line 804 from a position of the sensor 420 to an outside corner of the actor 802. As shown by FIG. 8, the line 804 intersects the trailer 404. The blind spot subsystem 412, however, may also determine a line 806 from the position of the sensor 422 to the outside corner of the actor 802. This line 806 does not intersect the trailer 404. In some examples, the blind spot subsystem 412 may determine that the actor 802 is not in the blind spot 411 because at least one of the sensors 420, 422 has a direct line of sight to at least a portion of the actor 802. FIG. 8 also includes lines 808, 810 determined from the positions of the respective sensors 420, 422 to a center of the actor 802. In this example, and in the example of FIG. 7, the respective actors 702, 802 are in the blind spot 411 regardless of whether the blind spot subsystem 412 considers lines to outside corners of the actor 702, 802 or lines to a center of the actor 702, 802.

Figure 9:
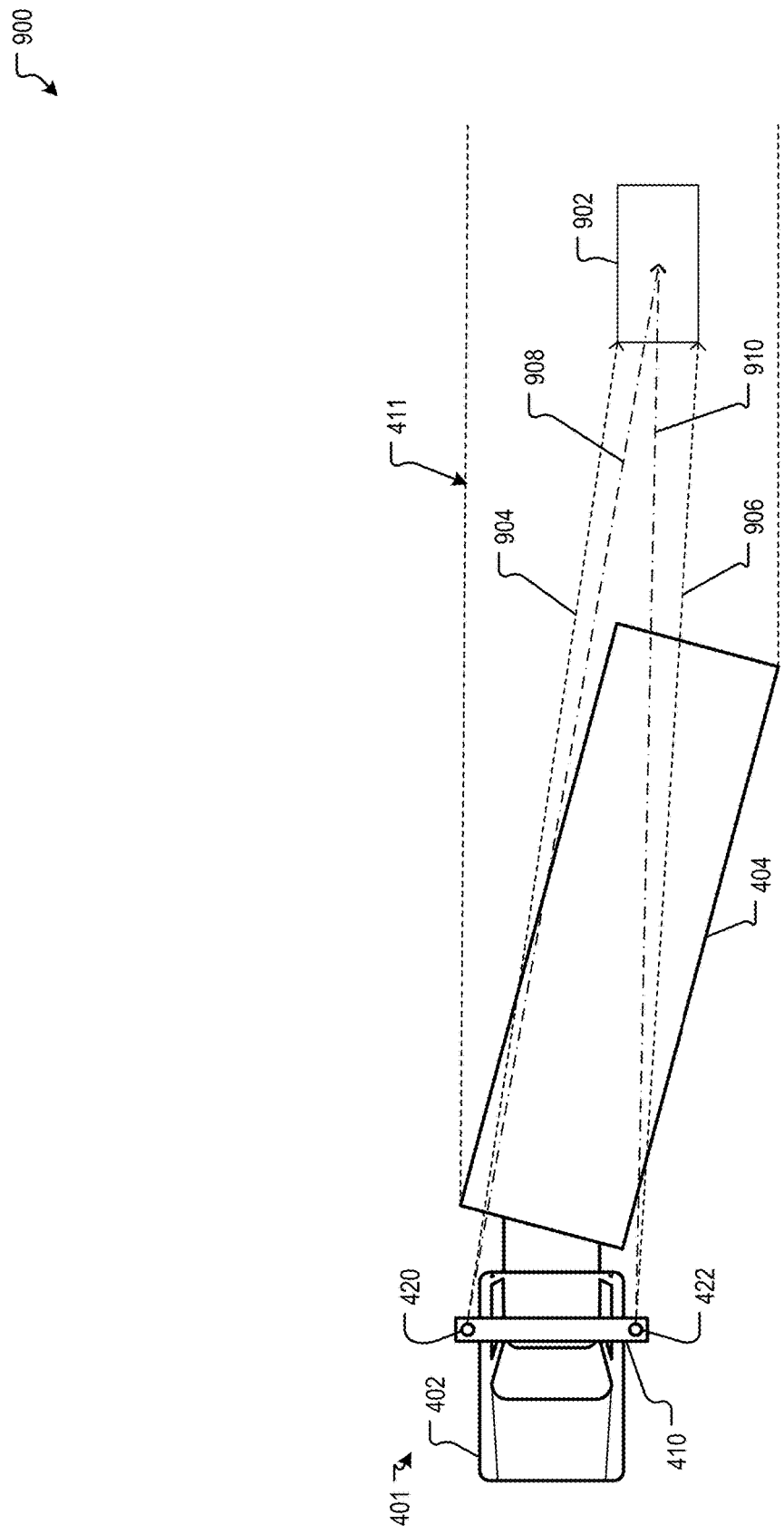
FIG. 9 is a diagram showing yet another arrangement of the autonomous vehicle of FIG. 4 and an actor in which the autonomous vehicle is turning to its left and the actor is in the blind spot.

FIG. 9 is a diagram 900 showing yet another arrangement of the autonomous vehicle 401 and an actor 902 in which the autonomous vehicle 401 is turning to its left and the actor 902 is in the blind spot 411. As illustrated in FIG. 9, the blind spot 411 is larger than when the autonomous vehicle 401 is traveling straight and is also in a different position, extending farther to the left of the autonomous vehicle 401. It will be appreciated that as the autonomous vehicle 401 maneuvers, and as the trailer 404 articulates relative to the autonomous tractor 402, the blind spot 411 may correspondingly change. In the example of FIG. 9, the actor 902 is present in the blind spot 411, as illustrated by lines 904, 906 from the positions of the respective sensors 420, 422 to the outside corners of the actor 902 and/or by lines 908, 910 from the positions of the respective sensors 420, 422 to the center of the actor 902.

Figure 10:
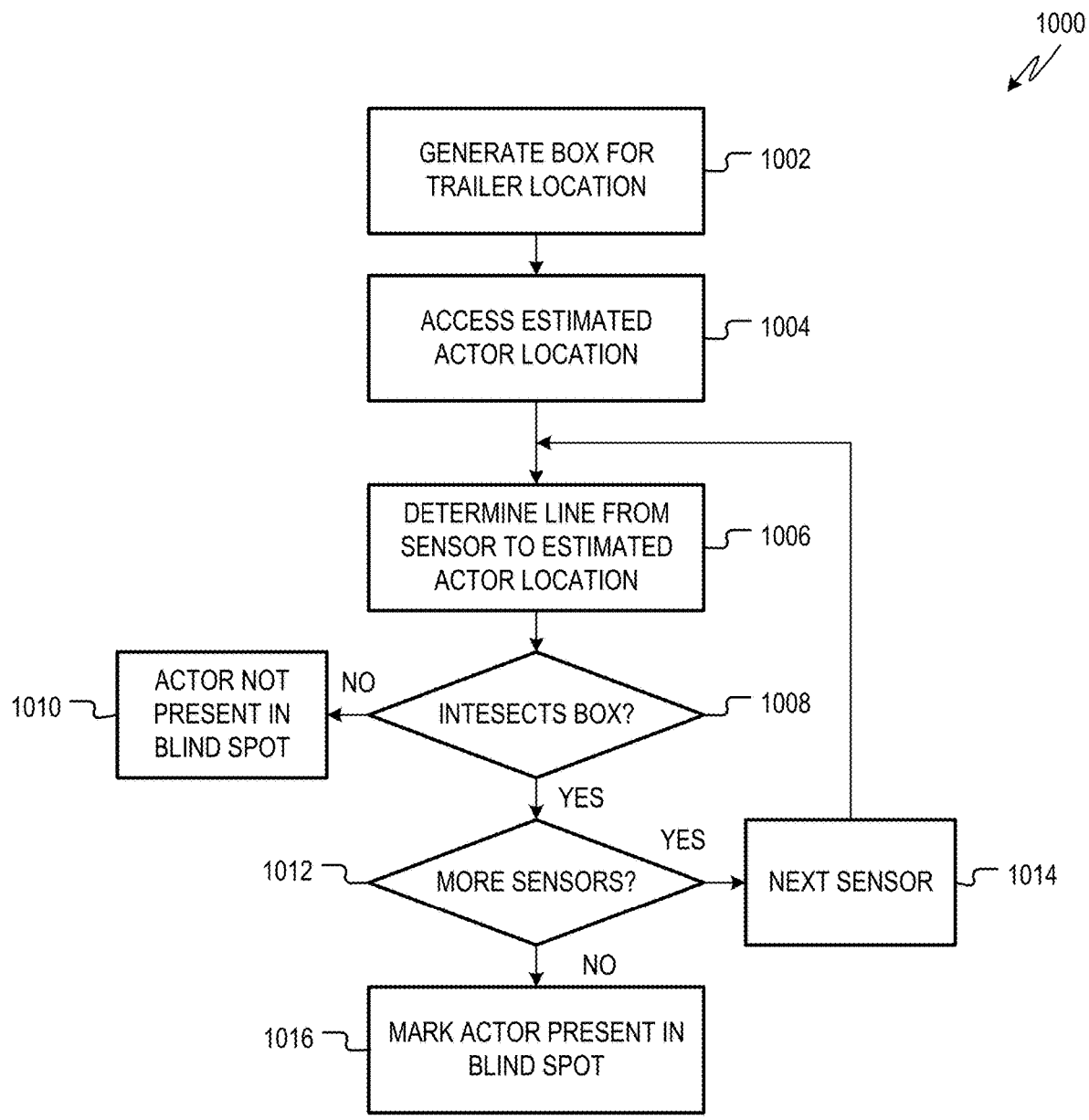
FIG. 10 is a flow chart of a process for determining whether an actor is present in the blind spot.

FIG. 10 is a flow chart of a process 1000 for determining whether an actor is present in the blind spot 411. The process 1000 shows one example of how the blind spot subsystem 412 can execute operation 606 of the process 600 described herein. At operation 1002, the blind spot subsystem 412 may generate a box indicating the location of the trailer 404. The box may be based on the proposed instance of the trailer 404 described herein. At operation 1004, the blind spot subsystem 412 may access estimated actor location data. The estimated actor location may be based on sensor data 204 from a current sensing cycle, and/or may be based on sensor data 204 from previous sensing cycles.

At operation 1006, the blind spot subsystem 412 may determine a line from a sensor location of a first sensor to the estimated actor location. At operation 1008, the blind spot subsystem 412 may determine if the line from operation 1006 intersects the box indicating the location of the trailer 404. If the line does not intersect the box, the blind spot subsystem 412 may determine, at operation 1010, that the actor is not present in the blind spot.

If the blind spot subsystem 412 determines at operation 1008 that the line determined at operation 1006 does intersect the box indicating the location of the trailer 404, it may indicate that the field-of-view of the sensor considered at operation 1006 is obstructed such that the actor is not represented by sensor data 204 generated by the first sensor. Accordingly, the blind spot subsystem 412 may determine if the autonomous vehicle 401 includes any other sensors that can generate sensor data 204 describing the actor. At operation 1012, the blind spot subsystem 412 determines if there are any additional sensors at the autonomous vehicle 401. If there is at least one more sensor at operation 1012, the blind spot subsystem 412 may consider the next sensor at operation 1014 and return to operation 1006 to determine a line from the next sensor to the estimated actor location. If there are no more sensors, then at operation 1016, the blind spot subsystem 412 may indicate that the actor is present in the blind spot 411. This may include, for example, generating blind spot data 414 with a flag asserted to indicate that an actor is present in the blind spot 411.

Figure 11:
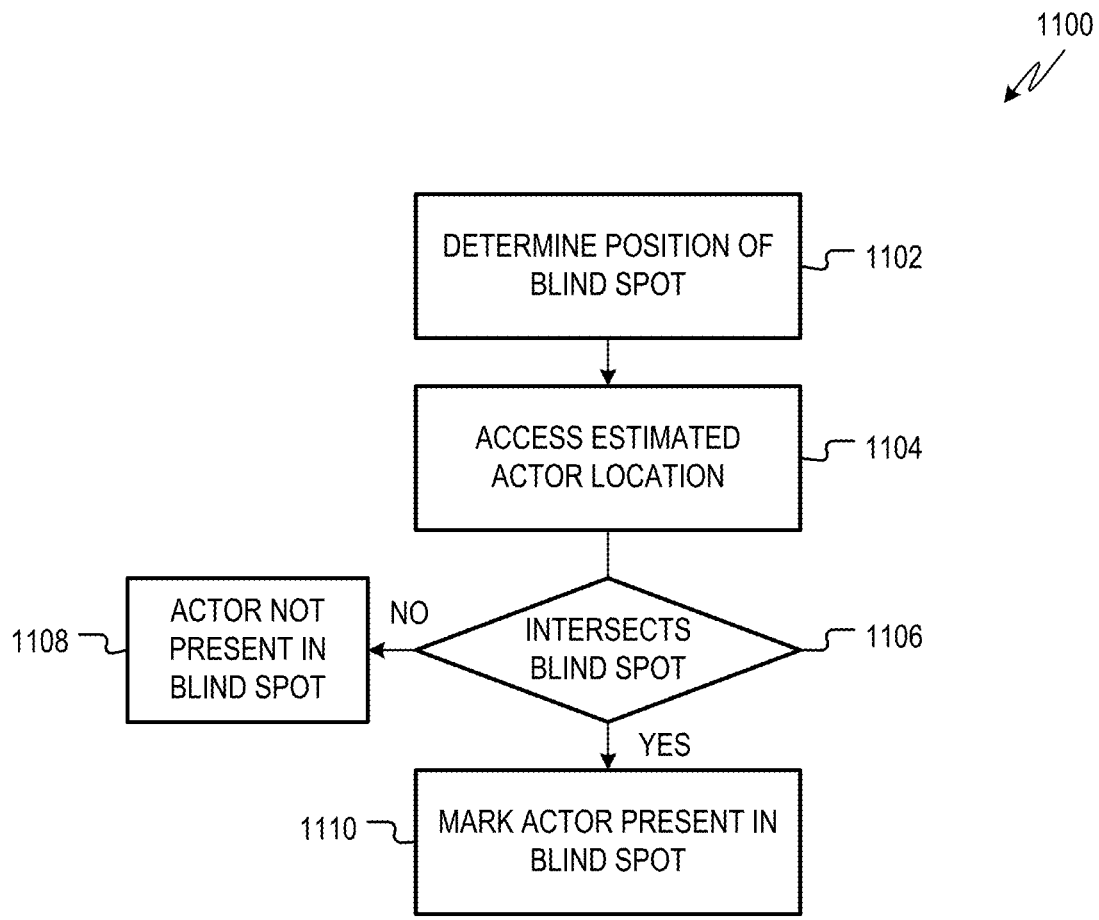
FIG. 11 is a flow chart of a process for determining whether an actor is present in the blind spot.

FIG. 11 is a flow chart of a process 1100 for determining whether an actor is present in the blind spot 411. The process 1100 shows another example way that the blind spot subsystem 412 can execute operation 606 of the process 600 described herein.

At operation 1102, the blind spot subsystem 412 determines a position of the blind spot 411. This may be performed in any suitable manner. For example, the blind spot subsystem 412 may access the most recent pose instance for the trailer 404. The blind spot subsystem 412 may determine an intersection between the fields of view of one or more sensors 420, 422 and the position of the trailer 404 as indicated by the trailer pose instance.

At operation 1104, the blind spot subsystem 412 may access estimated actor location data describing an estimated location of an actor, for example, as described herein. If, at operation 1106, the estimated location of the actor intersects the blind spot determined that operation 1102, the blind spot subsystem 412 may, at operation 1110, generate blind spot data 414 indicating that at least one actor is present in the blind spot 411. If the estimated location of the actor does not intersect the blind spot determined at operation 1102, the blind spot subsystem 412 may, at operation 1108, determine that the actor is not present in the blind spot 411.

Figure 12:
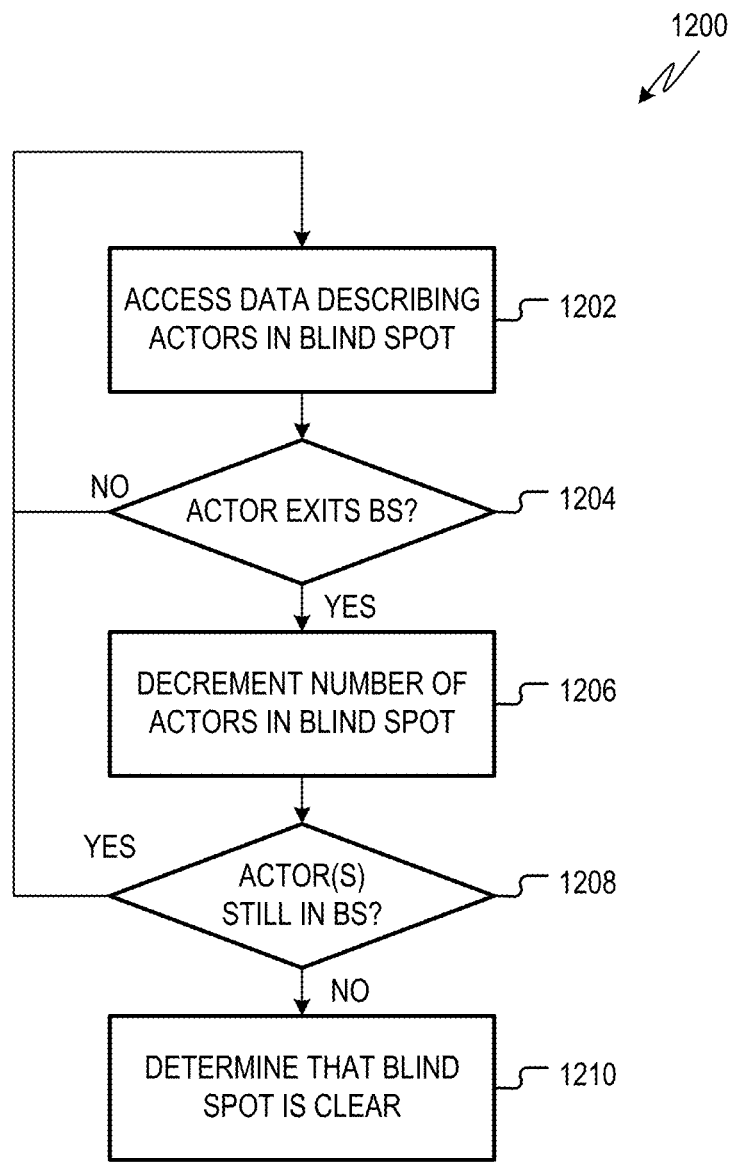
FIG. 12 is a flow chart of a process that may be executed to track multiple actors relative to the blind spot.

FIG. 12 is a flow chart of a process 1200 that may be executed by the blind spot subsystem 412 to track multiple actors relative to the blind spot 411. For example, the process 1200 demonstrates one example of how the blind spot subsystem 412 can execute operation 610 of the process 600 described herein.

At operation 1202, the blind spot subsystem 412 accesses data describing actors present in the blind spot 411. For example, the data accessed at operation 1202 may include some or all of the blind spot data 414 previously generated by the blind spot subsystem 412. In some examples, the blind spot subsystem 412 may track the number of actors present in the blind spot 411. For example, when the blind spot subsystem 412 determines that an actor is present in the blind spot 411, as described herein, the blind spot subsystem 412 may increment an indicator of the number of actors in the blind spot. Accessing the data describing the number of actors in the blind spot, in some examples, may include accessing the indicator maintained by the blind spot subsystem 412.

At operation 1204 the blind spot subsystem 412 may determine if any actors are determined to be exiting the blind spot 411. The blind spot subsystem 412 may determine that an actor is exiting the blind spot 411, for example, if the sensor data 204 generated for a given sensing cycle shows an actor in proximity to the blind spot 411 and, for example, state data for that actor either shows a trajectory out of the blind spot 411 or shows that the object was not tracked in a previous sensing cycle.

If no actor exits the blind spot at operation 1204, the blind spot subsystem 412 may return to operation 1202. In some examples, the blind spot subsystem 412 may execute the operations 1202 and 1204 for each sensing cycle of the autonomy system 200. Also, in some examples, the blind spot subsystem 412 may execute the operations 1202 and 1204 at less than all of the sensing cycles of the autonomy system 200, such as, for example, every second cycle, every third cycle, every fourth cycle, and so on.

If an actor has exited the blind spot 411 at operation 1204, the blind spot subsystem 412 may decrement a number of actors in the blind spot 411. If more than one actor is determined to be exiting the blind spot 411, the number of actors in the blind spot 411 may be decremented a number of times corresponding to the number of actors determined to be exiting the blind spot 411. At operation 1208, the blind spot subsystem may determine if there are any actors remaining in the blind spot 411. For example, if the number of actors in the blind spot 411 was one or less than one prior to operation 1206, there may be no actors in the blind spot 411 at operation 1208. Conversely, if the number of actors in the blind spot 411 was greater than one at operation 1206, there may be actors remaining in the blind spot 411. If there are actors remaining in the blind spot 411 at operation 1208, the blind spot subsystem 412 may return to operation 1202, for example at the next sensing cycle, as described herein. If there are no actors remaining in the blind spot at operation 1208, then the blind spot subsystem 412 may determine that the blind spot is clear at operation 1210.

Figure 13:
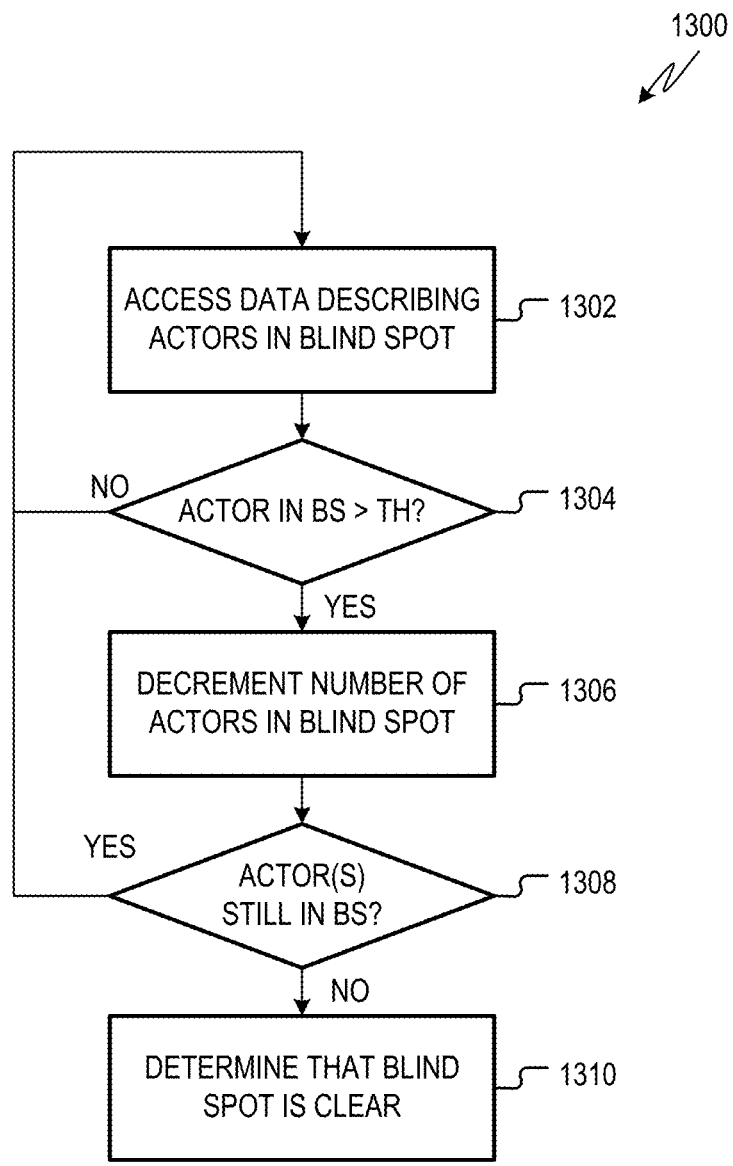
FIG. 13 is a flow chart of a process that may be executed to track multiple actors relative to the blind spot.

FIG. 13 is a flow chart of a process 1300 that may be executed by the blind spot subsystem 412 to track multiple actors relative to the blind spot 411. For example, the process 1300 demonstrates another example of how the blind spot subsystem 412 can execute optional operation 610 of the process 600 described herein. At operation 1302, the blind spot subsystem 412 accesses data describing actors present in the blind spot 411. For example, the data accessed at operation 1302 may include some or all of the blind spot data 414 previously generated by the blind spot subsystem 412, as described herein.

At operation 1304 the blind spot subsystem 412 may determine if any actors in the blind spot 411 have been considered to be in the blind spot 411 for greater than a threshold time period. For example, the autonomy system 200 may not always determine when an actor in the blind spot 411 leaves the blind spot 411. Also, in some examples, it may not be desirable and/or practical to determine actors exiting the blind spot 411. Accordingly, the blind spot subsystem 412 may consider an actor to have left the blind spot 411 when a threshold period of time has passed since the actor was determined to have entered the blind spot 411. The threshold time period may be any suitable time period such as, for example, a predetermined number of sensing cycles and/or a predetermined period of time (e.g., two minutes, five minutes, and/or the like).

If it is determined at operation 1304 that no actor has been in the blind spot 411 for longer than the threshold time period, the blind spot subsystem 412 may return to operation 1302. If one or more actors have been in the blind spot 411 for longer than the threshold time period, then the blind spot subsystem 412 may decrement the number of actors in the blind spot 411 at operation 1306. The number of actors in the blind spot 411 may be decremented a number of times corresponding to the number of actors determined, at operation 1304, to have been in the blind spot 411 for more than the threshold time period.

At operation 1308, the blind spot subsystem 412 may determine if there are any actors remaining in the blind spot 411. If there are actors remaining in the blind spot 411 at operation 1308, the blind spot subsystem 412 may return to operation 1302, for example at the next sensing cycle, as described herein. If there are no actors remaining in the blind spot at operation 1308, then the blind spot subsystem 412 may determine that the blind spot 411 is clear at operation 1310.

Figure 14:
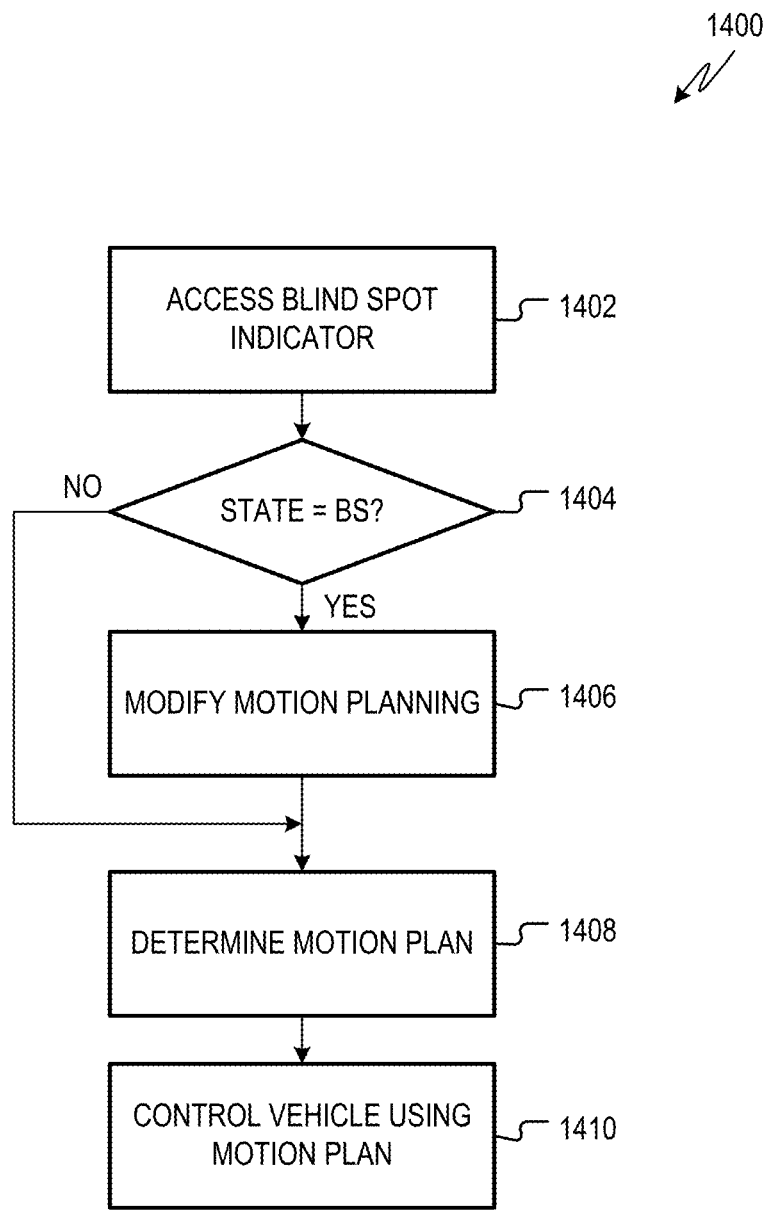
FIG. 14 is a flow chart of a process that may be executed to generate a motion plan when the blind spot data indicates the presence of an actor in the blind spot.

FIG. 14 is a flow chart of a process 1400 that may be executed by the autonomy system 200 (e.g., the planning system 250 thereof) to generate a motion plan when the blind spot data 414 generated by the blind spot subsystem 412 indicates the presence of an actor in the blind spot 411.

At operation 1402 the planning system 250 may access a blind spot indicator, for example, in the blind spot data 414. The blind spot indicator or flag, as described herein, may have a first state if the blind spot subsystem 412 determines that there is at least one actor in the blind spot 411. The blind spot indicator may have a second state different than the first state if the blind spot subsystem 412 determines that there are no actors in the blind spot 411.

At operation 1404, the planning system 250 determines if the state of the blind spot indicator indicates that there is at least one object in the blind spot 411. If the state of the blind spot indicator indicates that there are no objects in the blind spot 411, then the planning system 250 may determine a motion plan at operation 1408, and the control system 260 may control the vehicle using the motion plan at operation 1410.

If, at operation 1404, it is determined that the state of the blind spot indicator indicates that there is at least one actor in the blind spot 411, then the planning system 250 may modify motion planning at operation 1406. Modifying motion planning may include modifying at least one cost function associated with a candidate motion plan, as described herein. Upon modifying motion planning at operation 1406, the motion planning system may determine a motion plan in view of the modified motion planning at operation 1408 and the control system 260 may control the vehicle using the generated motion plan at operation 1410.

Figure 15:
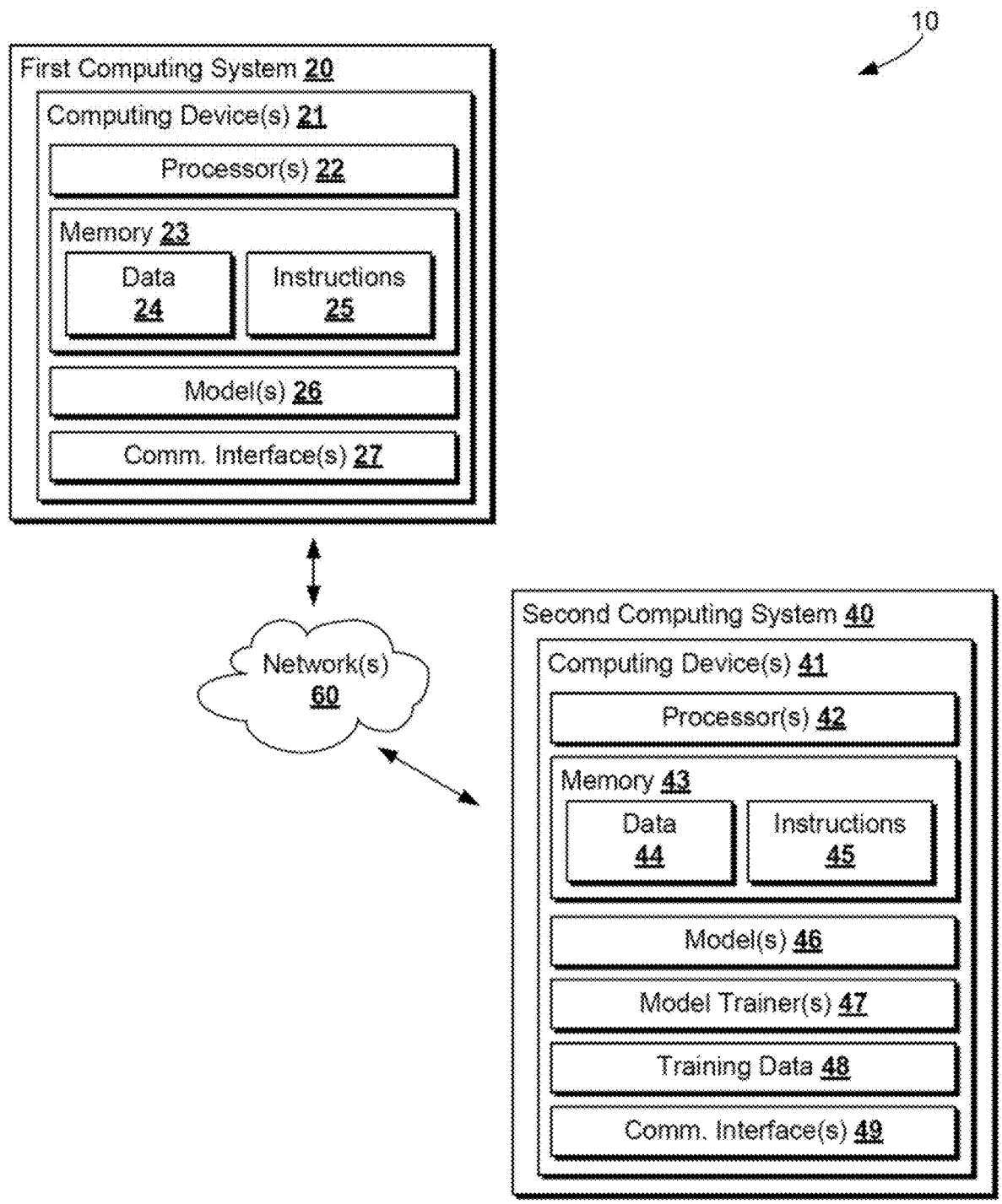
FIG. 15 is a block diagram of an example computing ecosystem according to example implementations of the present disclosure.

FIG. 15 is a block diagram of an example computing ecosystem 10 according to example implementations of the present disclosure. The example computing ecosystem 10 can include a first computing system 20 and a second computing system 40 that are communicatively coupled over one or more networks 60. In some implementations, the first computing system 20 or the second computing system 40 can implement one or more of the systems, operations, or functionalities described herein for data annotation (e.g., the remote system(s) 160, the onboard computing system(s) 180, the autonomy system 200, etc.).

In some implementations, the first computing system 20 can be included in an autonomous platform and be utilized to perform the functions of an autonomous platform as described herein. For example, the first computing system 20 can be located onboard an autonomous vehicle and implement autonomy system(s) for autonomously operating the autonomous vehicle. In some implementations, the first computing system 20 can represent the entire onboard computing system or a portion thereof (e.g., the localization system 230, the perception system 240, the planning system 250, the control system 260, or a combination thereof, etc.). In other implementations, the first computing system 20 may not be located onboard an autonomous platform. The first computing system 20 can include one or more distinct physical computing devices 21.

The first computing system 20 (e.g., the computing device(s) 21 thereof) can include one or more processors 22 and a memory 23. The one or more processors 22 can be any suitable processing device (e.g., a processor core, a microprocessor, an ASIC, a FPGA, a controller, a microcontroller, etc.) and can be one processor or a plurality of processors that are operatively connected. The memory 23 can include one or more non-transitory computer-readable storage media, such as RAM, ROM, EEPROM, EPROM, one or more memory devices, flash memory devices, etc., and combinations thereof.

The memory 23 can store information that can be accessed by the one or more processors 22. For instance, the memory 23 (e.g., one or more non-transitory computer-readable storage media, memory devices, etc.) can store data 24 that can be obtained (e.g., received, accessed, written, manipulated, created, generated, stored, pulled, downloaded, etc.). The data 24 can include, for instance, sensor data, map data, data associated with autonomy functions (e.g., data associated with the perception, planning, or control functions), simulation data, or any data or information described herein. In some implementations, the first computing system 20 can obtain data from one or more memory device(s) that are remote from the first computing system 20.

The memory 23 can store computer-readable instructions 25 that can be executed by the one or more processors 22. The instructions 25 can be software written in any suitable programming language or can be implemented in hardware. Additionally, or alternatively, the instructions 25 can be executed in logically or virtually separate threads on the processor(s) 22.

For example, the memory 23 can store instructions 25 that are executable by one or more processors (e.g., by the one or more processors 22, by one or more other processors, etc.) to perform (e.g., with the computing device(s) 21, the first computing system 20, or other system(s) having processors executing the instructions) any of the operations, functions, or methods/processes (or portions thereof) described herein. For example, operations can include generating boundary data for annotating sensor data, such as for implementing part of a training pipeline for machine-learned machine vision systems.

In some implementations, the first computing system 20 can store or include one or more models 26. In some implementations, the models 26 can be or can otherwise include one or more machine-learned models. As examples, the models 26 can be or can otherwise include various machine-learned models such as, for example, regression networks, generative adversarial networks, neural networks (e.g., deep neural networks), support vector machines, decision trees, ensemble models, k-nearest neighbors models, Bayesian networks, or other types of models including linear models or non-linear models. Example neural networks include feed-forward neural networks, recurrent neural networks (e.g., long short-term memory recurrent neural networks), convolutional neural networks, or other forms of neural networks. For example, the first computing system 20 can include one or more models for implementing subsystems of the autonomy system 200, including any of: the localization system 230, the perception system 240, the planning system 250, or the control system 260.

In some implementations, the first computing system 20 can obtain the one or more models 26 using communication interface(s) 27 to communicate with the second computing system 40 over the network(s) 60. For instance, the first computing system 20 can store the model(s) 26 (e.g., one or more machine-learned models) in the memory 23. The first computing system 20 can then use or otherwise implement the models 26 (e.g., by the processors 22). By way of example, the first computing system 20 can implement the model(s) 26 to localize an autonomous platform in an environment, perceive an autonomous platform's environment or objects therein, plan one or more future states of an autonomous platform for moving through an environment, control an autonomous platform for interacting with an environment, etc.

The second computing system 40 can include one or more computing devices 41. The second computing system 40 can include one or more processors 42 and a memory 43. The one or more processors 42 can be any suitable processing device (e.g., a processor core, a microprocessor, an ASIC, a FPGA, a controller, a microcontroller, etc.) and can be one processor or a plurality of processors that are operatively connected. The memory 43 can include one or more non-transitory computer-readable storage media, such as RAM, ROM, EEPROM, EPROM, one or more memory devices, flash memory devices, etc., and combinations thereof.

The memory 43 can store information that can be accessed by the one or more processors 42. For instance, the memory 43 (e.g., one or more non-transitory computer-readable storage media, memory devices, etc.) can store data 44 that can be obtained. The data 44 can include, for instance, sensor data, model parameters, map data, simulation data, simulated environmental scenes, simulated sensor data, data associated with vehicle trips/services, or any data or information described herein. In some implementations, the second computing system 40 can obtain data from one or more memory device(s) that are remote from the second computing system 40.

The memory 43 can also store computer-readable instructions 45 that can be executed by the one or more processors 42. The instructions 45 can be software written in any suitable programming language or can be implemented in hardware. Additionally, or alternatively, the instructions 45 can be executed in logically or virtually separate threads on the processor(s) 42.

For example, the memory 43 can store instructions 45 that are executable (e.g., by the one or more processors 42, by the one or more processors 22, by one or more other processors, etc.) to perform (e.g., with the computing device(s) 41, the second computing system 40, or other system(s) having processors for executing the instructions, such as computing device(s) 21 or the first computing system 20) any of the operations, functions, or methods/processes described herein. This can include, for example, the functionality of the autonomy system 200 (e.g., localization, perception, planning, control, etc.) or other functionality associated with an autonomous platform (e.g., remote assistance, mapping, fleet management, trip/service assignment and matching, etc.).

In some implementations, the second computing system 40 can include one or more server computing devices. In the event that the second computing system 40 includes multiple server computing devices, such server computing devices can operate according to various computing architectures, including, for example, sequential computing architectures, parallel computing architectures, or some combination thereof.

Additionally, or alternatively to the model(s) 26 at the first computing system 20, the second computing system 40 can include one or more models 46. As examples, the model(s) 46 can be or can otherwise include various machine-learned models such as, for example, regression networks, generative adversarial networks, neural networks (e.g., deep neural networks), support vector machines, decision trees, ensemble models, k-nearest neighbors models, Bayesian networks, or other types of models including linear models or non-linear models. Example neural networks include feed-forward neural networks, recurrent neural networks (e.g., long short-term memory recurrent neural networks), convolutional neural networks, or other forms of neural networks. For example, the second computing system 40 can include one or more models of the autonomy system 200.

In some implementations, the second computing system 40 or the first computing system 20 can train one or more machine-learned models of the model(s) 26 or the model(s) 46 through the use of one or more model trainers 47 and training data 48. The model trainer(s) 47 can train any one of the model(s) 26 or the model(s) 46 using one or more training or learning algorithms. One example training technique is backwards propagation of errors. In some implementations, the model trainer(s) 47 can perform supervised training techniques using labeled training data. In other implementations, the model trainer(s) 47 can perform unsupervised training techniques using unlabeled training data. In some implementations, the training data 48 can include simulated training data (e.g., training data obtained from simulated scenarios, inputs, configurations, environments, etc.). In some implementations, the second computing system 40 can implement simulations for obtaining the training data 48 or for implementing the model trainer(s) 47 for training or testing the model(s) 26 or the model(s) 46. By way of example, the model trainer(s) 47 can train one or more components of a machine-learned model for the autonomy system 200 through unsupervised training techniques using an objective function (e.g., costs, rewards, heuristics, constraints, etc.). In some implementations, the model trainer(s) 47 can perform a number of generalization techniques to improve the generalization capability of the model(s) being trained. Generalization techniques include weight decays, dropouts, or other techniques.

For example, in some implementations, the second computing system 40 can generate training data 48 according to example aspects of the present disclosure. For instance, the second computing system 40 can generate training data 48. The second computing system 40 can use the training data 48 to train model(s) 26. For example, in some implementations, the first computing system 20 can include a computing system onboard or otherwise associated with a real or simulated autonomous vehicle. In some implementations, model(s) 26 can include perception or machine vision model(s) configured for deployment onboard or in service of a real or simulated autonomous vehicle. In this manner, for instance, the second computing system 40 can provide a training pipeline for training model(s) 26.

The first computing system 20 and the second computing system 40 can each include communication interfaces 27 and 49, respectively. The communication interfaces 27, 49 can be used to communicate with each other or one or more other systems or devices, including systems or devices that are remotely located from the first computing system 20 or the second computing system 40. The communication interfaces 27, 49 can include any circuits, components, software, etc. for communicating with one or more networks (e.g., the network(s) 60). In some implementations, the communication interfaces 27, 49 can include, for example, one or more of a communications controller, receiver, transceiver, transmitter, port, conductors, software or hardware for communicating data.

The network(s) 60 can be any type of network or combination of networks that allows for communication between devices. In some implementations, the network(s) can include one or more of a local area network, wide area network, the Internet, secure network, cellular network, mesh network, peer-to-peer communication link or some combination thereof and can include any number of wired or wireless links. Communication over the network(s) 60 can be accomplished, for instance, through a network interface using any type of protocol, protection scheme, encoding, format, packaging, etc.

FIG. 15 illustrates one example computing ecosystem 10 that can be used to implement the present disclosure. Other systems can be used as well. For example, in some implementations, the first computing system 20 can include the model trainer(s) 47 and the training data 48. In such implementations, the model(s) 26, 46 can be both trained and used locally at the first computing system 20. As another example, in some implementations, the computing system 20 may not be connected to other computing systems. Additionally, components illustrated or discussed as being included in one of the computing systems 20 or 40 can instead be included in another one of the computing systems 20 or 40.

Computing tasks discussed herein as being performed at computing device(s) remote from the autonomous platform (e.g., autonomous vehicle) can instead be performed at the autonomous platform (e.g., via a vehicle computing system of the autonomous vehicle), or vice versa. Such configurations can be implemented without deviating from the scope of the present disclosure. The use of computer-based systems allows for a great variety of possible configurations, combinations, and divisions of tasks and functionality between and among components. Computer-implemented operations can be performed on a single component or across multiple components. Computer-implemented tasks or operations can be performed sequentially or in parallel. Data and instructions can be stored in a single memory device or across multiple memory devices.

Aspects of the disclosure have been described in terms of illustrative implementations thereof. Numerous other implementations, modifications, or variations within the scope and spirit of the appended claims can occur to persons of ordinary skill in the art from a review of this disclosure. Any and all features in the following claims can be combined or rearranged in any way possible. Accordingly, the scope of the present disclosure is by way of example rather than by way of limitation, and the subject disclosure does not preclude inclusion of such modifications, variations or additions to the present subject matter as would be readily apparent to one of ordinary skill in the art. Moreover, terms are described herein using lists of example elements joined by conjunctions such as "and," "or," "but," etc. It should be understood that such conjunctions are provided for explanatory purposes only. Lists joined by a particular conjunction such as "or," for example, can refer to "at least one of" or "any combination of" example elements listed therein, with "or" being understood as "and/or" unless otherwise indicated. Also, terms such as "based on" should be understood as "based at least in part on."

Those of ordinary skill in the art, using the disclosures provided herein, will understand that the elements of any of the claims, operations, or processes discussed herein can be adapted, rearranged, expanded, omitted, combined, or modified in various ways without deviating from the scope of the present disclosure. Some of the claims are described with a letter reference to a claim element for exemplary illustrated purposes and is not meant to be limiting. The letter references do not imply a particular order of operations. For instance, letter identifiers such as (a), (b), (c), . . . , (i), (ii), (iii), . . . , etc. can be used to illustrate operations. Such identifiers are provided for the ease of the reader and do not denote a particular order of steps or operations. An operation illustrated by a list identifier of (a), (i), etc. can be performed before, after, or in parallel with another operation illustrated by a list identifier of (b), (ii), etc.

What is claimed is:

1. A method for controlling an autonomous vehicle comprising a tractor and a trailer, the method comprising:
    accessing sensor position data describing a position of a first sensor on the autonomous vehicle;
    accessing actor position data describing a position of a first actor in an environment of the autonomous vehicle;
    determining a pose of the trailer, the pose of the trailer describing a position of the trailer;
    determining, using the pose of the trailer, that a line from the position of the first sensor to the position of the first actor intersects the trailer;
    determining that the first actor is in a blind spot of the autonomous vehicle based at least in part on the determining that the line from the position of the first sensor to the position of the first actor intersects the trailer;
    generating a motion plan for the autonomous vehicle based at least in part on the determining that the first actor is in the blind spot of the autonomous vehicle; and
    controlling the autonomous vehicle in accordance with the motion plan.

2. The method of claim 1, the sensor position data also describing a position of a second sensor on the autonomous vehicle, the method further comprising:
    determining that a second line from the position of the second sensor to the position of the first actor intersects the trailer, the determining that the first actor is in the blind spot of the autonomous vehicle also being based at least in part on the determining that the second line from the position of the second sensor to the position of the first actor intersects the trailer.

3. The method of claim 1, the sensor position data describing positions of a plurality of sensors, the plurality of sensors comprising the first sensor, the method further comprising:
    determining that lines from the respective positions of each sensor of the plurality of sensors intersect the trailer, the determining that the first actor is in the blind spot of the autonomous vehicle also being based at least in part on the determining that the lines from the respective positions of each sensor of the plurality of sensors intersects the trailer.

4. The method of claim 1, the sensor position data also describing a position of a second actor in the environment of the autonomous vehicle and the sensor position data also describing a position of a second sensor on the autonomous vehicle, the method further comprising:
    determining that a line from the position of the first sensor to the position of the second actor intersects the trailer;
    determining that a line from the position of the second sensor to the position of the second actor does not intersect the trailer; and
    determining that the second actor is outside the blind spot of the autonomous vehicle.

5. The method of claim 1, further comprising determining the position of the first actor based at least in part on last known state data describing a last known state of the first actor.

6. The method of claim 5, the last known state data comprising at least one of a last known location of the first actor, a last known velocity of the first actor, a last known acceleration of the first actor, a last known heading of the first actor or a last known orientation of the first actor.

7. The method of claim 1, further comprising setting a blind spot flag to indicate that at least one actor is in the blind spot of the autonomous vehicle, the generating of the motion plan being based at least in part on the blind spot flag.

8. The method of claim 1, further comprising generating an estimated track for the first actor in the blind spot of the autonomous vehicle using last known state data describing a last known state of the first actor, the generating of the motion plan being based at least in part on the estimated track for the first actor.

9. The method of claim 1, the generating of the motion plan comprising:
modifying a cost associated with a first candidate motion plan of a plurality of candidate motion plans to generate a modified cost;
using the modified cost to determine a cost associated with the first candidate motion plan; and
selecting the motion plan from the plurality of candidate motion plans, the selecting being based at least in part on the cost associated with the first candidate motion plan.

10. The method of claim 1, the generating of the motion plan comprising:
modifying a first candidate motion plan to generate a modified first motion plan, the modifying being based at least in part on the determining that the first actor is in the blind spot of the autonomous vehicle; and
selecting the motion plan from a plurality of candidate motion plans, the plurality of candidate motion plans including the modified first motion plan.

11. The method of claim 10, the modifying of the first candidate motion plan comprising at least one of:
modifying an acceleration associated with the first candidate motion plan; or
modifying a lateral speed associated with the first candidate motion plan.

12. The method of claim 1, further comprising:
accessing blind spot actor data describing at least one actor in the blind spot of the autonomous vehicle;
determining that sensor data generated by at least one sensor on the autonomous vehicle indicates that an actor has exited the blind spot of the autonomous vehicle; and
decrementing a number of actors in the blind spot.

13. The method of claim 1, further comprising:
accessing blind spot actor data describing at least one actor in the blind spot of the autonomous vehicle, the at least one actor comprising the first actor;
determining that more than a threshold time period has passed since the determining that the first actor is in the blind spot of the autonomous vehicle; and
decrementing a number of actors in the blind spot.

14. The method of claim 1, further comprising:
determining that there are no actors remaining in the blind spot of the autonomous vehicle;
generating a second motion plan for the autonomous vehicle based at least in part on the determining that there are no actors remaining in the blind spot of the autonomous vehicle; and
controlling the autonomous vehicle in accordance with the second motion plan.

15. An autonomous vehicle comprising:
a tractor;
a trailer; and
at least one processor programmed to perform operations comprising:
accessing sensor position data describing a position of a first sensor on the autonomous vehicle;
accessing actor position data describing a position of a first actor in an environment of the autonomous vehicle;
determining a pose of the trailer, the pose of the trailer describing a position of the trailer;
determining, using the pose of the trailer, that a line from the position of the first sensor to the position of the first actor intersects the trailer;
determining that the first actor is in a blind spot of the autonomous vehicle based at least in part on the determining that the line from the position of the first sensor to the position of the first actor intersects the trailer;
generating a motion plan for the autonomous vehicle based at least in part on the determining that the first actor is in the blind spot of the autonomous vehicle; and
controlling the autonomous vehicle in accordance with the motion plan.

16. The autonomous vehicle of claim 15, the generating of the motion plan comprising:
modifying a cost associated with a first candidate motion plan of a plurality of candidate motion plans to generate a modified cost;
using the modified cost to determine a cost associated with the first candidate motion plan; and
selecting the motion plan from the plurality of candidate motion plans, the selecting being based at least in part on the cost associated with the first candidate motion plan.

17. The autonomous vehicle of claim 15, the generating of the motion plan comprising:
modifying a first candidate motion plan to generate a modified first motion plan, the modifying being based at least in part on the determining that the first actor is in the blind spot of the autonomous vehicle; and
selecting the motion plan from a plurality of candidate motion plans, the plurality of candidate motion plans including the modified first motion plan.

18. The autonomous vehicle of claim 17, the modifying of the first candidate motion plan comprising at least one of:
modifying an acceleration associated with the first candidate motion plan; or
modifying a lateral speed associated with the first candidate motion plan.

19. A non-transitory computer-readable storage medium comprising instructions thereon that, when executed by one or more processors, cause the one or more processors to perform operations comprising:
accessing sensor position data describing a position of a first sensor on an autonomous vehicle, the autonomous vehicle comprising a tractor and a trailer;

accessing actor position data describing a position of a first actor in an environment of the autonomous vehicle;

determining a pose of the trailer, the pose of the trailer describing a position of the trailer;

determining, using the pose of the trailer, that a line from the position of the first sensor to the position of the first actor intersects the trailer;

determining that the first actor is in a blind spot of the autonomous vehicle based at least in part on the determining that the line from the position of the first sensor to the position of the first actor intersects the trailer;

generating a motion plan for the autonomous vehicle based at least in part on the determining that the first actor is in the blind spot of the autonomous vehicle; and controlling the autonomous vehicle in accordance with the motion plan.

20. The non-transitory computer-readable storage medium of claim 19, the sensor position data also describing a position of a second sensor on the autonomous vehicle, the operations further comprising:

determining that a second line from the position of the second sensor to the position of the first actor intersects the trailer, the determining that the first actor is in the blind spot of the autonomous vehicle also being based at least in part on the determining that the second line from the position of the second sensor to the position of the first actor intersects the trailer.

* * * * *